(12) United States Patent
Tjellesen et al.

(10) Patent No.: US 12,005,642 B2
(45) Date of Patent: Jun. 11, 2024

(54) SLED CONFIGURATIONS AND METHODS OF OPERATION FOR THE MANUFACTURE OF THREE-DIMENSIONAL OBJECTS

(71) Applicant: Stratasys Powder Production Ltd., London (GB)

(72) Inventors: Frederik Tjellesen, London (GB); Anders Hartmann, London (GB); Neil Hopkinson, London (GB)

(73) Assignee: Stratasys Powder Production Ltd., London (GB)

( * ) Notice: Subject to any disclaimer, the term of this patent is extended or adjusted under 35 U.S.C. 154(b) by 0 days.

(21) Appl. No.: 18/301,478

(22) Filed: Apr. 17, 2023

(65) Prior Publication Data
US 2023/0249400 A1    Aug. 10, 2023

Related U.S. Application Data

(63) Continuation of application No. 17/311,242, filed on Jun. 4, 2021, now Pat. No. 11,660,809.

(51) Int. Cl.
*B29C 64/165* (2017.01)
*B22F 10/14* (2021.01)
*B22F 10/28* (2021.01)
*B22F 12/13* (2021.01)
*B22F 12/45* (2021.01)
*B22F 12/67* (2021.01)
*B29C 64/209* (2017.01)
(Continued)

(52) U.S. Cl.
CPC ............ *B29C 64/165* (2017.08); *B22F 10/14* (2021.01); *B22F 10/28* (2021.01); *B22F 12/13* (2021.01); *B22F 12/45* (2021.01); *B22F 12/67* (2021.01); *B29C 64/209* (2017.08); *B29C 64/218* (2017.08); *B29C 64/236* (2017.08); *B29C 64/277* (2017.08); *B29C 64/282* (2017.08); *B29C 64/314* (2017.08); *B33Y 10/00* (2014.12); *B33Y 30/00* (2014.12); *B33Y 40/10* (2020.01);
(Continued)

(58) Field of Classification Search
None
See application file for complete search history.

(56) References Cited

U.S. PATENT DOCUMENTS 7,850,885 B2   12/2010  Philippi et al.
10,286,571 B2   5/2019  Hochsmann et al.
(Continued)

FOREIGN PATENT DOCUMENTS

GB    2532518 A    5/2016
WO    201611989 A1    8/2016
(Continued)

*Primary Examiner* — Mary Lynn F Theisen
(74) *Attorney, Agent, or Firm* — Honigman LLP; Eric J. Sosenko; Jonathan P. O'Brien

(57) ABSTRACT

A method of manufacturing a three-dimensional object from a powder to form each layer of the object. The method includes the steps of driving a powder distribution sled in a first direction to distribute a layer of powder; driving a print sled in the first direction; driving the print sled and the powder distribution sled in a second direction; preheating the layer of powder by activating multiple radiation sources during various ones of the driving steps; during some of the driving steps, depositing a pattern of fluid onto the layer of powder; and sintering the powder on which fluid was deposited only in the second direction, by activating the at least one radiation source assembly during various ones of the driving steps in that direction. Repeating the above steps to distribute the next layer of powder.

11 Claims, 20 Drawing Sheets

(51) Int. Cl.
   *B29C 64/218* (2017.01)
   *B29C 64/236* (2017.01)
   *B29C 64/277* (2017.01)
   *B29C 64/282* (2017.01)
   *B29C 64/314* (2017.01)
   *B33Y 10/00* (2015.01)
   *B33Y 30/00* (2015.01)
   *B33Y 40/10* (2020.01)
   *B22F 10/68* (2021.01)
   *B22F 10/73* (2021.01)
   *B22F 12/41* (2021.01)
   *B22F 12/90* (2021.01)

(52) U.S. Cl.
   CPC ............... *B22F 10/68* (2021.01); *B22F 10/73* (2021.01); *B22F 12/41* (2021.01); *B22F 12/90* (2021.01)

(56) References Cited

U.S. PATENT DOCUMENTS

| | | |
|---|---|---|
| 2015/0314530 A1 | 11/2015 | Rogren |
| 2017/0282456 A1 | 10/2017 | Wright et al. |
| 2017/0355137 A1 | 12/2017 | Ederer et al. |
| 2017/0368748 A1 | 12/2017 | De Pena et al. |
| 2018/0304367 A1 | 10/2018 | Myerberg et al. |

FOREIGN PATENT DOCUMENTS

| | | |
|---|---|---|
| WO | 2017023281 A1 | 2/2017 |
| WO | 2017153463 A1 | 9/2017 |
| WO | 2017194105 A1 | 11/2017 |
| WO | 2018017122 A1 | 1/2018 |
| WO | 2018017136 A1 | 1/2018 |
| WO | 2018075033 A1 | 4/2018 |
| WO | 2018075087 A1 | 4/2018 |
| WO | 2018194688 A1 | 10/2018 |

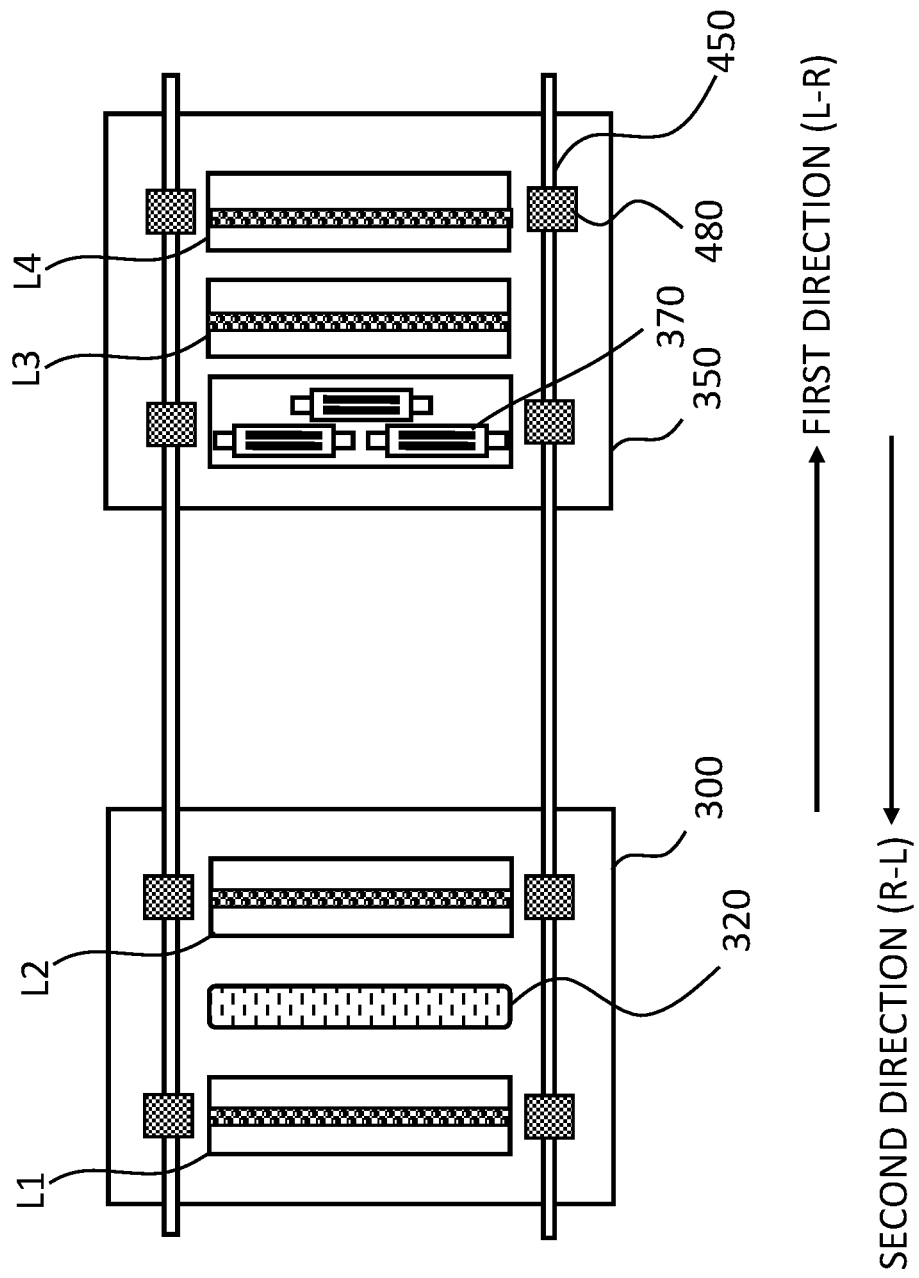

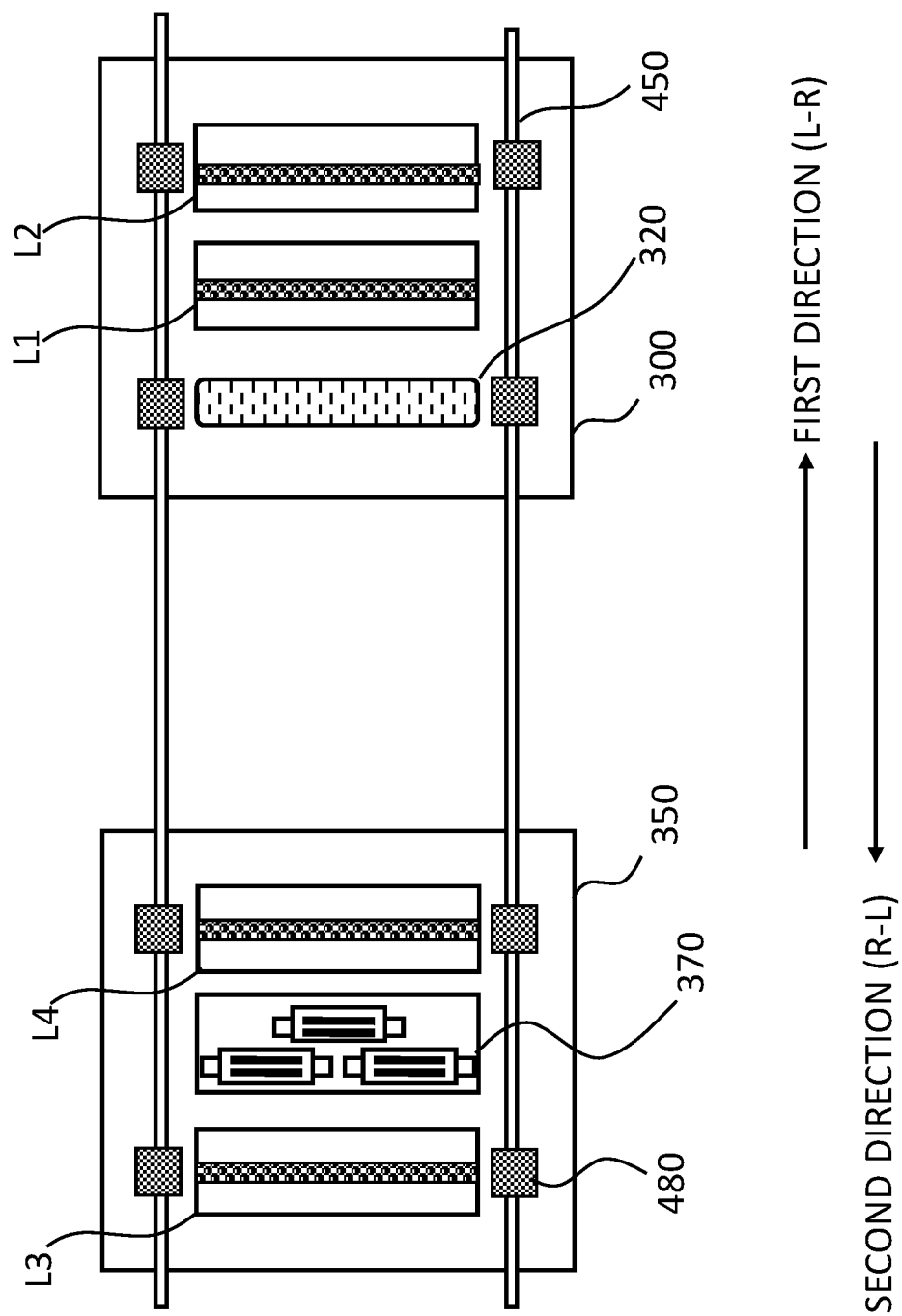

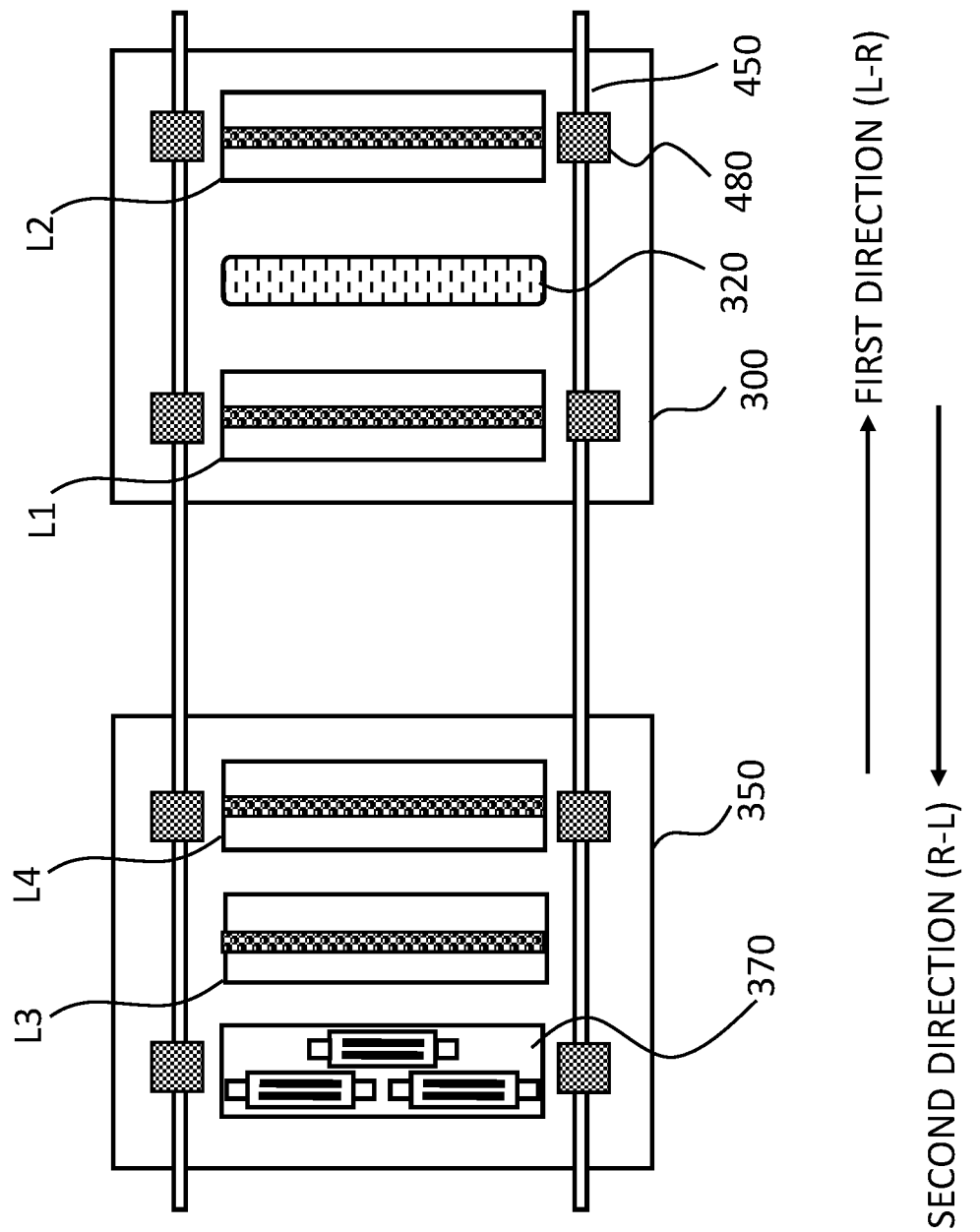

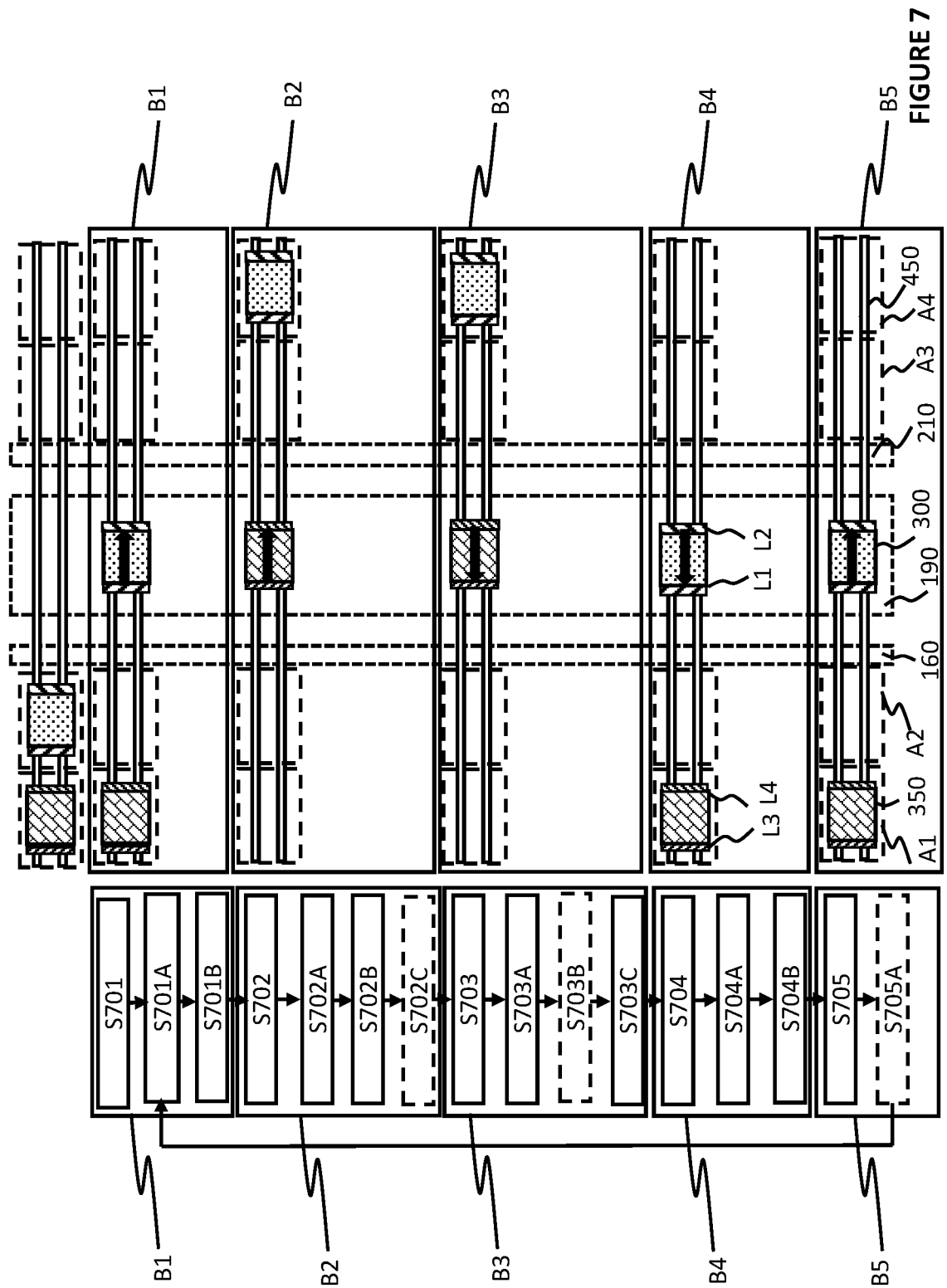

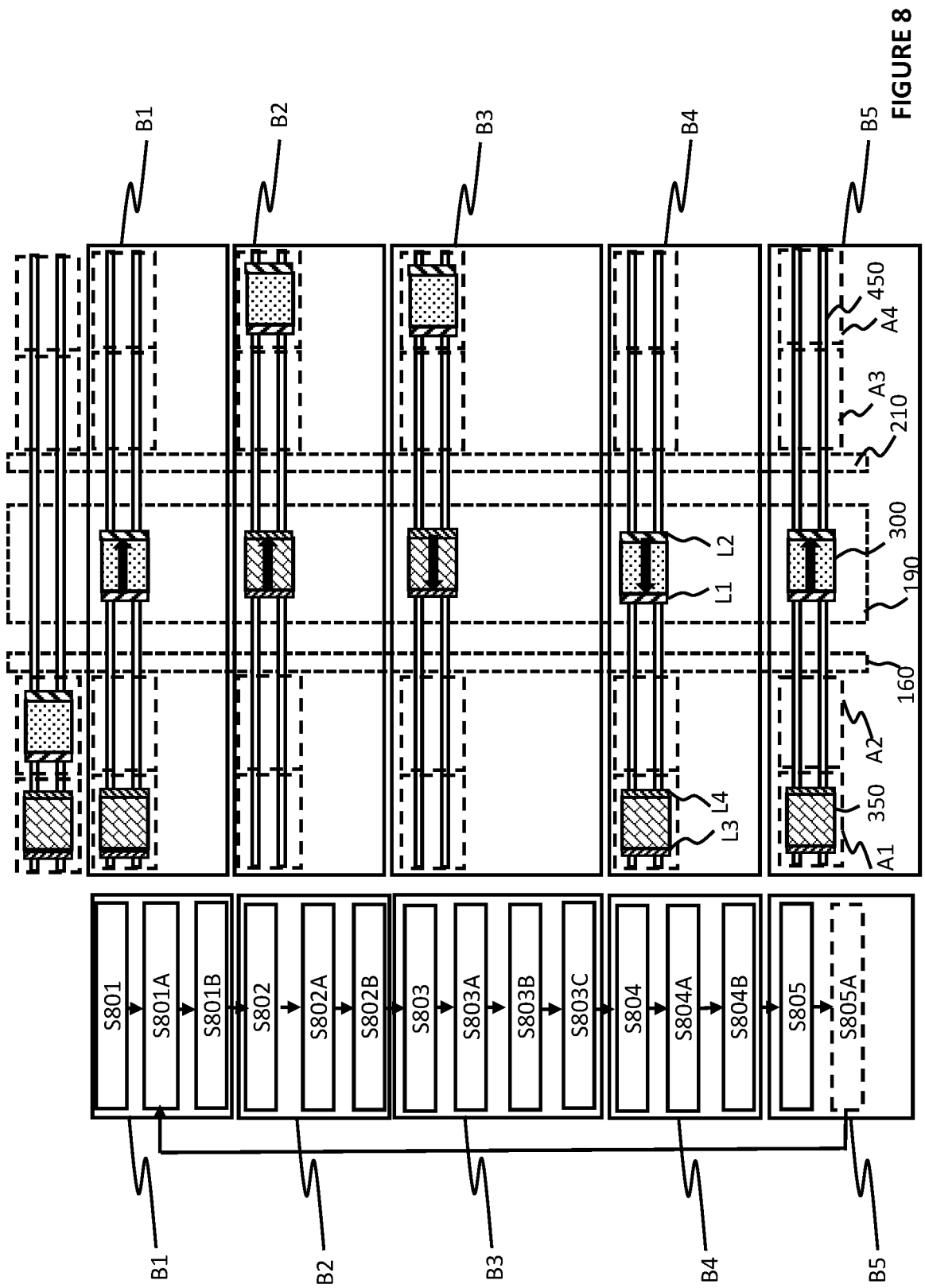

SLED CONFIGURATIONS AND METHODS OF OPERATION FOR THE MANUFACTURE OF THREE-DIMENSIONAL OBJECTS

CROSS REFERENCE TO RELATED APPLICATIONS

This application is a continuation of U.S. patent application Ser. No. 17/311,242, filed Jun. 4, 2021, which is a national stage entry of international application no. PCT/GB2019/053438, filed Dec. 5, 2019, which is based on and claims the benefit of foreign priority under 35 U.S.C. 119 to GB 1820019.6, filed Dec. 7, 2018. To the extent permissible, the entire contents of the above-referenced applications are herein expressly incorporated by reference.

FIELD OF INVENTION

The present disclosure relates to apparatus and methods for the layer-by-layer formation of three-dimensional (3D) objects. More particularly, the disclosure relates to apparatus and methods for use in powder-based manufacturing of three-dimensional objects.

BACKGROUND

Apparatus for the manufacture of three-dimensional objects on a layer-by-layer basis from powder, and various powder-based methods for manufacturing, such as selective laser sintering and high speed sintering, are known. These powder-based methods comprise a series of steps, including distributing a layer of powder, preheating that layer of powder, and sintering the powder in accordance with image data for that layer of the three-dimensional object to be built. Another layer of powder is then distributed and the series of steps is repeated until the desired three-dimensional object is generated. The image data may be obtained from a CAD (Computer Aided Design) model or from any other form of digital representation. The image data may be processed into slices, with each slice defining one or more parts of a respective layer of powder to be formed into the object.

In the manufacturing of a three-dimensional object, a radiation source assembly (e.g. one or more infra-red lamps) may be used to preheat and sinter the powder. The preheating temperature is enough to warm up the distributed powder but lower than the sintering temperature. Firstly, the entire layer of powder, or the region(s) of the layer corresponding to the part(s) of the object to be formed within that layer, are preheated. Then, the part(s) of the object within that layer are sintered using a radiation source assembly.

More particularly, in the sintering stage, a fluid such as a radiation absorbing material (RAM), which absorbs the radiation and converts it into thermal energy, may be deposited (e.g. using one or more print heads) onto the preheated layer of powder in accordance with the image data, to deposit a pattern of fluid defining the region(s) of the object to be formed within that layer of powder. The deposited fluid is then exposed to the radiation source assembly to sinter the powder in said pattern, to form a layer of the object and to fuse that layer of the object to the layer below.

In such a method of manufacturing a three-dimensional object, it is desirable to improve control of the timing between successive steps (e.g. between the preheating and printing steps, and/or between the printing and sintering steps), for example to reduce the time between successive steps to mitigate against unwanted cooling of the powder layer, and/or to maintain an even temperature throughout the powder layer, so as to avoid adverse effects on the three-dimensional object being manufactured.

SUMMARY

The present disclosure provides an improved apparatus and methods for manufacturing a three-dimensional object. Aspects of the invention are set out in the appended independent claims, while details of particular embodiments are set out in the appended dependent claims.

According to a first aspect of the invention, there is provided apparatus for manufacturing a three-dimensional object from a powder, the apparatus comprising: a build bed having a build area, wherein successive layers of said three-dimensional object are formed in the build bed; a powder distribution sled operable to distribute a layer of powder within the build area, the powder distribution sled being driveable in a first direction along a first axis, across the build area, and driveable in a second direction, opposite to the first direction, along the first axis; and a print sled operable to deposit a pattern of fluid onto the layer of powder within the build area to define the cross section of said object in said layer, the print sled being driveable in the first direction along a second axis across the build area, and driveable in the second direction along the second axis; wherein the first axis is parallel to, or coaxial with, the second axis; wherein the print sled comprises one or more droplet deposition heads for depositing the fluid, a first radiation source assembly, and a second radiation source assembly; wherein the powder distribution sled comprises a powder distribution device for distributing the powder, a third radiation source assembly and a fourth radiation source assembly; and wherein each of the first, second, third and fourth radiation source assemblies is operable to both preheat and sinter powder within the build area.

According to a second aspect of the invention, there is provided a method of manufacturing a three-dimensional object from a powder, using apparatus according to the first aspect of the invention to form each layer of said object.

BRIEF DESCRIPTION OF THE DRAWINGS

Embodiments will now be described by way of non-limiting examples, with reference to the accompanying Figures of which:

FIG. 3B schematically illustrates the arrangement of a powder distribution sled and a print sled according to a second variant of first sled layout "A" (viewed from below);

FIG. 6B schematically illustrates the arrangement of a powder distribution sled and a print sled according to a second variant of second sled layout "B" (viewed from below);

FIG. 6D schematically illustrates the arrangement of a powder distribution sled and a print sled according to a fourth variant of second sled layout "B" (viewed from below);

FIG. 7 schematically illustrates a flow diagram of a first 3D manufacturing method using the second sled layout "B";

FIG. 8 schematically illustrates a flow diagram of a second 3D manufacturing method using the second sled layout "B";

In the figures, like elements are indicated by like reference numerals throughout.

DETAILED DESCRIPTION

The apparatus and methods of the present disclosure enable improved timing control to be achieved between successive steps of the three-dimensional object manufacturing process. For example, the apparatus and methods may be used to reduce the time between successive steps to mitigate against unwanted cooling of the powder layer, and/or to maintain an even temperature throughout the powder layer, and/or to achieve consistent timing of the various steps of the manufacturing process.

Moreover, by virtue of the present apparatus and methods, the heating of the powder layer may be better controlled so that all parts of the build bed have the same thermal history in respect of the radiation imparted by the radiation source assemblies, and three-dimensional objects having strong inter-particle bond strength can be manufactured.

Furthermore, the present apparatus and methods provide increased flexibility in terms of use of different powder materials, adjustability of the process parameters, use of different radiation source assemblies, use of different numbers of radiation source assemblies, and use of different intensities of radiation—along with the ability to adjust and control the timing between the various steps, as mentioned above.

Additionally, the present apparatus and methods enable heat to be applied in multiple steps within the formation of a layer, thereby avoiding the need to apply heat at high energy in a short time period and incurring unwanted overheating, especially in areas of the build bed where sintering/consolidation is not desired.

Reference will now be made in detail to the embodiments, examples of which are illustrated in the accompanying drawings. In the following detailed description numerous specific details are set forth by way of examples in order to provide a thorough understanding of the relevant teachings. However, it will be apparent to one of ordinary skill in the art that the present teachings may be practiced without these specific details.

Apparatus Overview

Figure 1:
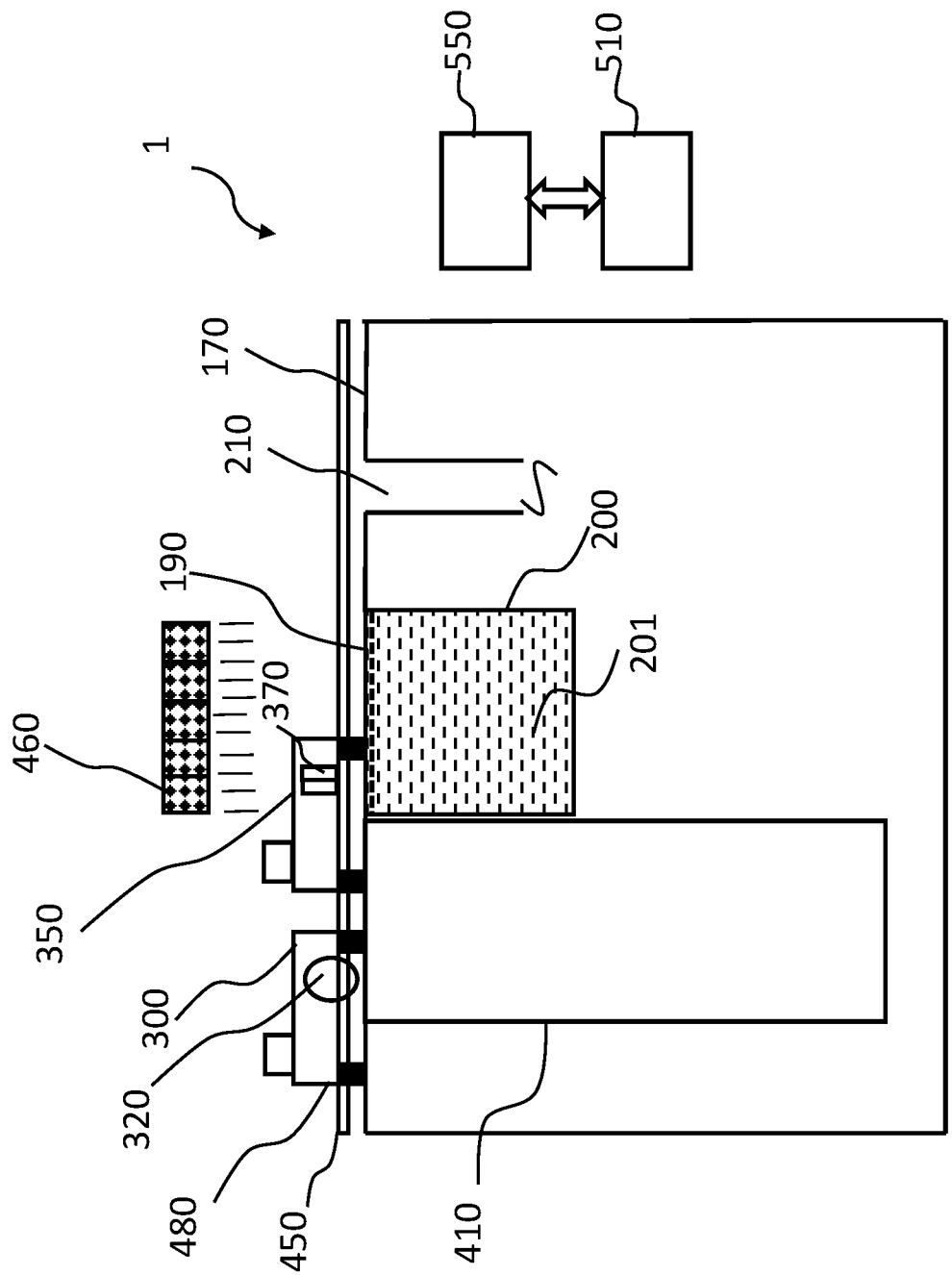
FIG. 1 schematically illustrates a cross-sectional front view of an apparatus for the manufacture of three-dimensional objects.

FIG. 1 schematically illustrates a front view of an apparatus 1 for the manufacture of three-dimensional objects. The apparatus 1 is operable to fabricate three-dimensional objects from a powder, and includes a powder supply module 410 for storing the powder, a work surface 170 comprising a build area 190 provided at the top of a build bed 201 which is within a build chamber 200 wherein successive layers of the three-dimensional object are formed, a powder distribution sled 300 operable to distribute a layer of powder within the build area 190, a print sled 350 operable to print (by means of one or more droplet deposition heads) a fluid pattern to define the cross-section of the three-dimensional object to be manufactured in that layer of powder, and radiation source assemblies (discussed in detail below; not shown in FIG. 1) to preheat and sinter the powder to form the corresponding layer of the object.

The powder may be, or may comprise, a thermoplastic polymeric material such as PA11, PA12, PA6, polypropylene (PP), polyurethane or other polymers. Some metals or ceramics may also be compatible with the apparatus dependent on the sintering temperature achievable by the radiation source assembly of the apparatus, and whether or not the metal or ceramic powder absorbs certain wavelengths which may be used for preheating. The examples of "powder" material are not limited to these, and any suitable material known in the art that may be utilized to build a three-dimensional object may be used.

The powder may be delivered to the powder supply module 410 from an external tank (not shown) or a hopper or a container, as required. According to one embodiment, fresh "virgin" powder is conveyed to the powder supply module 410. Fresh "virgin" powder is considered to be a powder which has not been used in the apparatus 1 previously. A powder return outlet 210 may be provided, for example to one side of the build area 190, as illustrated in FIG. 1. Excess powder which is not sintered during a cycle of the apparatus 1 may be returned to the powder supply module 410, e.g. via the powder return outlet 210, and blended with the virgin powder. Alternatively, the excess powder may be collected into a separate container and then fed to the powder supply module 410 through the external tank.

The fluid may be a liquid such as a radiation absorbing material (RAM) or a fluid powder comprising a radiation absorbing material. Moreover, the fluid may be a sinter-promoting fluid, a non-sinter-promoting fluid, or a fluid that may inhibit the sintering and may thereby enhance the edge definition of the object.

The powder distribution sled 300 and the print sled 350 are arranged on bearings 480 on rails 450. The rails 450 suspend the sleds 300, 350 above the work surface 170 of the apparatus 1. An overhead radiation source assembly 460, such as a ceramic heater, may be provided above the build area 190.

The expression "radiation source assembly" in this disclosure should be interpreted broadly, to not only encompass a single radiation source such as a lamp, but also to encompass an assembly of multiple radiation sources (e.g. a plurality of lamps). In the latter case, each of the radiation sources may have a different radiation intensity and may be selectively activated by a controller.

A cycle of the apparatus 1 is considered to begin when a layer of powder is distributed in the build area 190. A fluid such as radiation absorbing material (RAM) is then deposited onto the layer of powder, to define the cross-section of the three-dimensional object to be manufactured in that layer, and the build area 190 is then exposed to radiation from a radiation source assembly to sinter the powder. Following sintering, the build area 190 is lowered, this is considered to be the end of the cycle. When another layer of the powder is distributed in the build area 190, the next cycle of the apparatus is considered to have begun.

The powder supply module 410 may be provided with an auger to convey the powder to the top of the powder supply module 410. Alternatively, the powder supply module may have a piston to move the powder upwards to deliver it to the work surface 170. The powder supply module 410 may have one or more structures within the tank, such as different sections or pipes within the tank, to deliver powder at the top of the work surface 170. Any structure of apparatus known in the art that may be used to store and deliver the powder may be utilized as a powder supply module. Furthermore, the powder supply module may comprise one or more agitation devices to keep the powder flowing freely and to avoid compaction of the powder within the powder supply module 410. The entire powder or part of the powder may be continuously or periodically agitated using an agitation device. Alternatively, the powder supply module 410 may comprise a sub-tank which may store the powder and the sub-tank may be rotated to keep the powder in a free flowing state. Additionally, the powder supply module may comprise a heater for example, heating foil to heat (preheat)/warm up the powder within the powder supply module 410.

Figure 2:
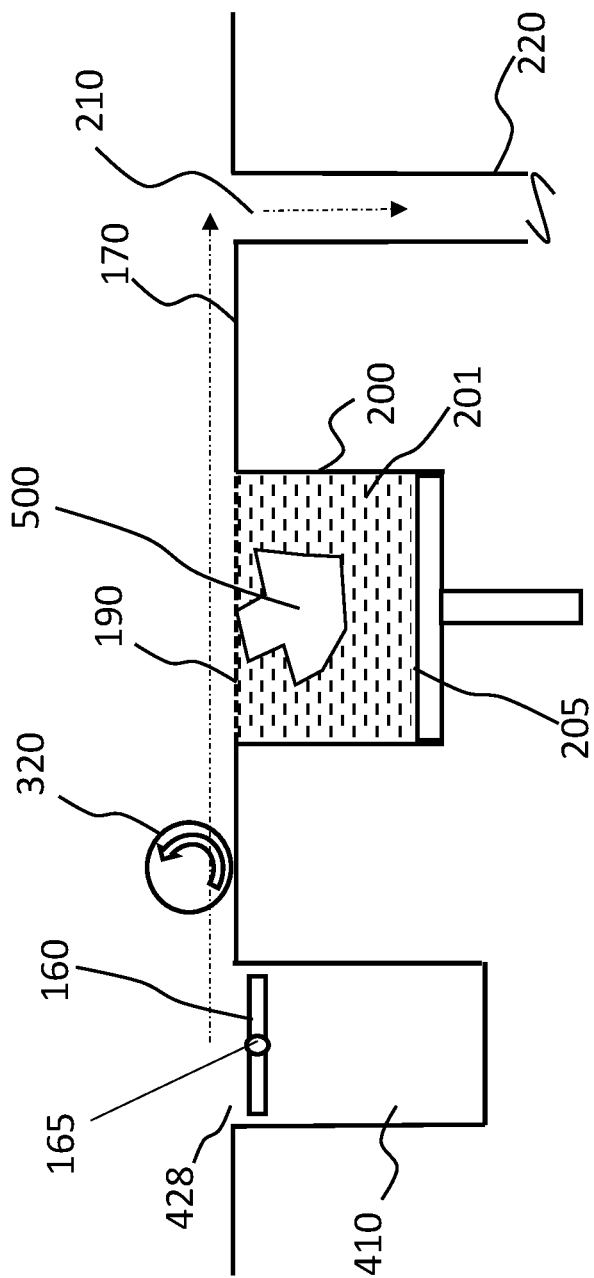
FIG. 2 schematically illustrates a cut through of components of the apparatus of FIG. 1.

FIG. 2 schematically illustrates a cut through of the components of the apparatus 1. The apparatus 1 comprises a dosing blade 160 provided at or near the top of the powder supply module 410. The dosing blade 160 is capable of rotation about an axis of rotation, which is the axis extending through a central pivot shaft 165 of the dosing blade 160 and along one side of the working surface. The powder supply module 410 may have an outlet 428 (for example a slot) and optionally narrowing sides at the top of powder supply module 410 within which the dosing blade 160 may rotate.

When the dosing blade 160 is rotated through 180 degrees, it pushes powder which has accumulated near the top of the powder supply module 410 onto the work surface 170, to form a pile of powder on the work surface 170. Alternatively, a pile of powder may be partially formed on the work surface 170 and partially on the dosing blade.

The powder is then spread across the work surface 170 by a powder distribution device 320, which is mounted on the powder distribution sled 300. For any of the below-described powder distribution sleds, the powder distribution device 320 for spreading the powder across the build area can take the form of any known spreading device, for example a blade, a roller (which may be a counter-rotating roller), a spreader, a levelling device, a coating unit or a compacting device.

Moreover, although the powder supply module 410 is depicted in the Figures as being positioned below the work surface 170, the powder supply module 410 may alternatively be located above the work surface 170 and may be gravity fed. In the event that the powder supply module 410 is above the work surface 170, the powder distribution device 320 may have a slot to store the powder received from the powder supply module and the powder distribution device 320 may distribute the powder through the slot. Alternatively, if the powder supply module 410 is above the work surface 170, the powder distribution device 320 may be a non-contact type powder distribution device which may have a container to store powder and one or more nozzles to distribute a layer of powder, and may not require a dosing blade to provide a pile of powder.

The powder distribution device 320 distributes the powder across the work surface 170, covering the build area 190 in a layer of powder. The thickness of the layer of powder is determined by the distance by which the build chamber floor 205 (and thus the surface of the build area 190) is lowered following the deposition of the fluid and sintering of those parts of the layer where the fluid has been deposited. The thickness of the layer may depend on the type of object to be built and/or may depend on the required resolution of the object. The thickness of the layer may range from 50 μm to 1000 μm or sometimes greater than 1000 μm.

The three-dimensional object 500 to be manufactured is formed within the build area 190 of the build chamber 200. A layer of powder is spread within the build area 190. The fluid is deposited on the powder and the powder underlying the printed area is sintered, as discussed in detail below, after which the build chamber floor 205 is lowered within the build chamber 200, and the next layer of powder is spread onto the build area 190. The layers of powder are built up by successive powder distribution, fluid deposition and sintering steps, and after each series of steps the build chamber floor 205 is lowered within the build chamber 200 by the thickness of a layer.

Any excess powder at the end of travel of the powder distribution device 320 which has not been used in covering the build area 190 may be recovered for further use. FIG. 2 illustrates the powder return outlet 210 provided at a side of the build area 190 opposite from the dosing blade 160. The powder return outlet 210 may be arranged to receive excess powder which is pushed into the powder return outlet 210 by the powder distribution device 320. The powder return outlet 210 is coupled to a return tube 220. The excess powder travels along the return tube 220. The return tube 220 may be arranged such that the excess powder travels along it by a gravitational force. The unused excess powder in the powder return outlet 210 may be recirculated via a return tube 220 and may be returned to the powder supply module 410. Alternatively, the return tube 220 may be connected to an external container where the unused excess powder may be collected. According to one embodiment, a filter or mesh may be provided in the powder return outlet 210 to prevent unwanted objects from entering the apparatus 1. Examples of unwanted objects are large agglomerations, broken of parts from sintered/printed models or similar unwanted objects. In the event the external container is used to collect excess powder, such a filter or mesh may not be required in the powder return outlet.

It should be appreciated that the return tube 220 is not limited to having a cylindrical cross section. Instead, the return tube may have any suitable cross section, for example that of a semicircle, oblong, or rectangular cross section etc.

Furthermore, it should be noted that the below-described methods are not dependent on the presence of the powder return outlet 210 or the return tube 220.

The dosing blade 160 provides approximately the same amount of powder for each layer distribution step, which may be more powder than is required for a new powder layer, and the excess powder which is not required may be pushed into the powder return outlet 210. By providing an excess of powder at the work surface 170, an even distribution of the powder across the build area 190 may be achieved. The length of the dosing blade 160 and the width of the outlet 428 of the powder supply module 410 may vary depending on the required layer thickness. The dimensions of the outlet 428 of the powder supply module 410 may be adjusted such that the dosing blade 160 may freely rotate within the outlet 428 and dust particles may not reach the work surface.

Sled Layouts

Figure 3:
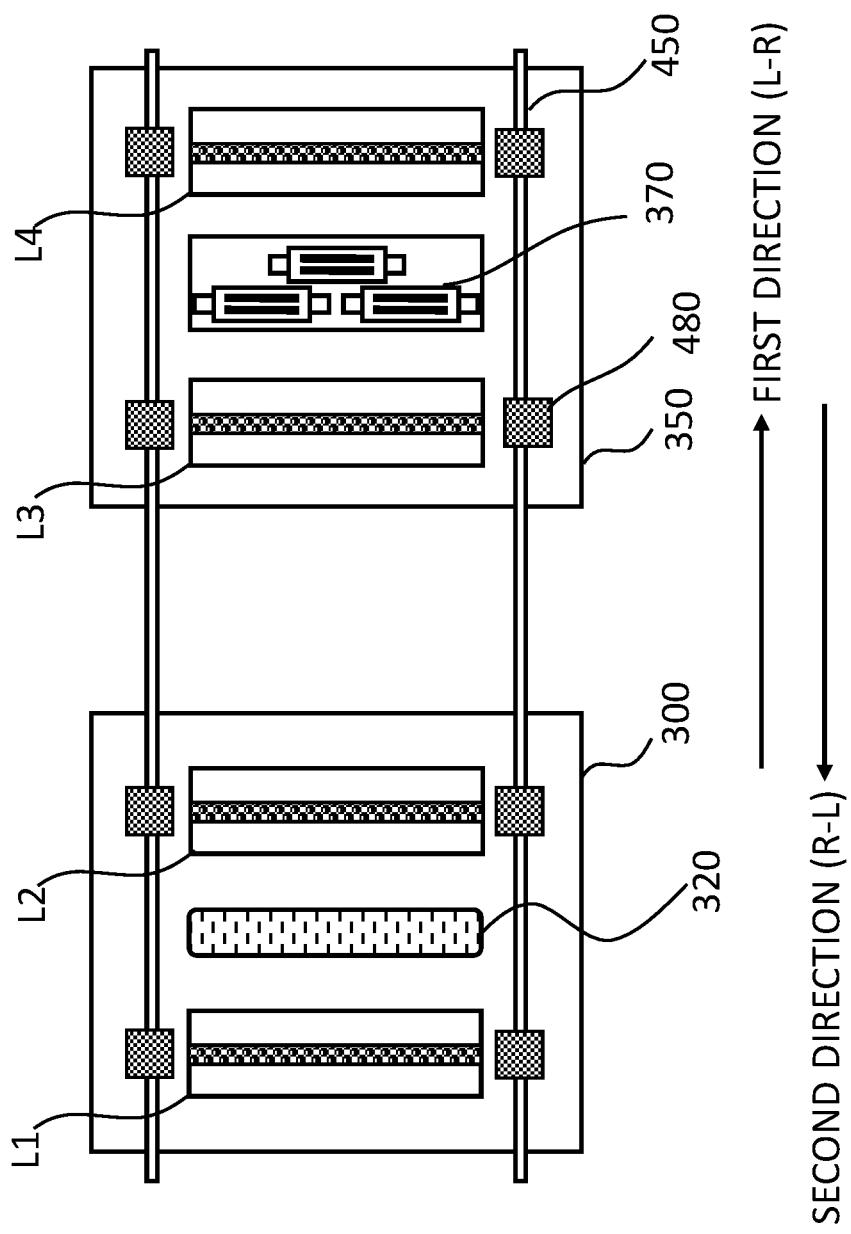
FIG. 3 schematically illustrates the arrangement of a powder distribution sled and a print sled according to a first sled layout "A" (viewed from below)
Figure 6:
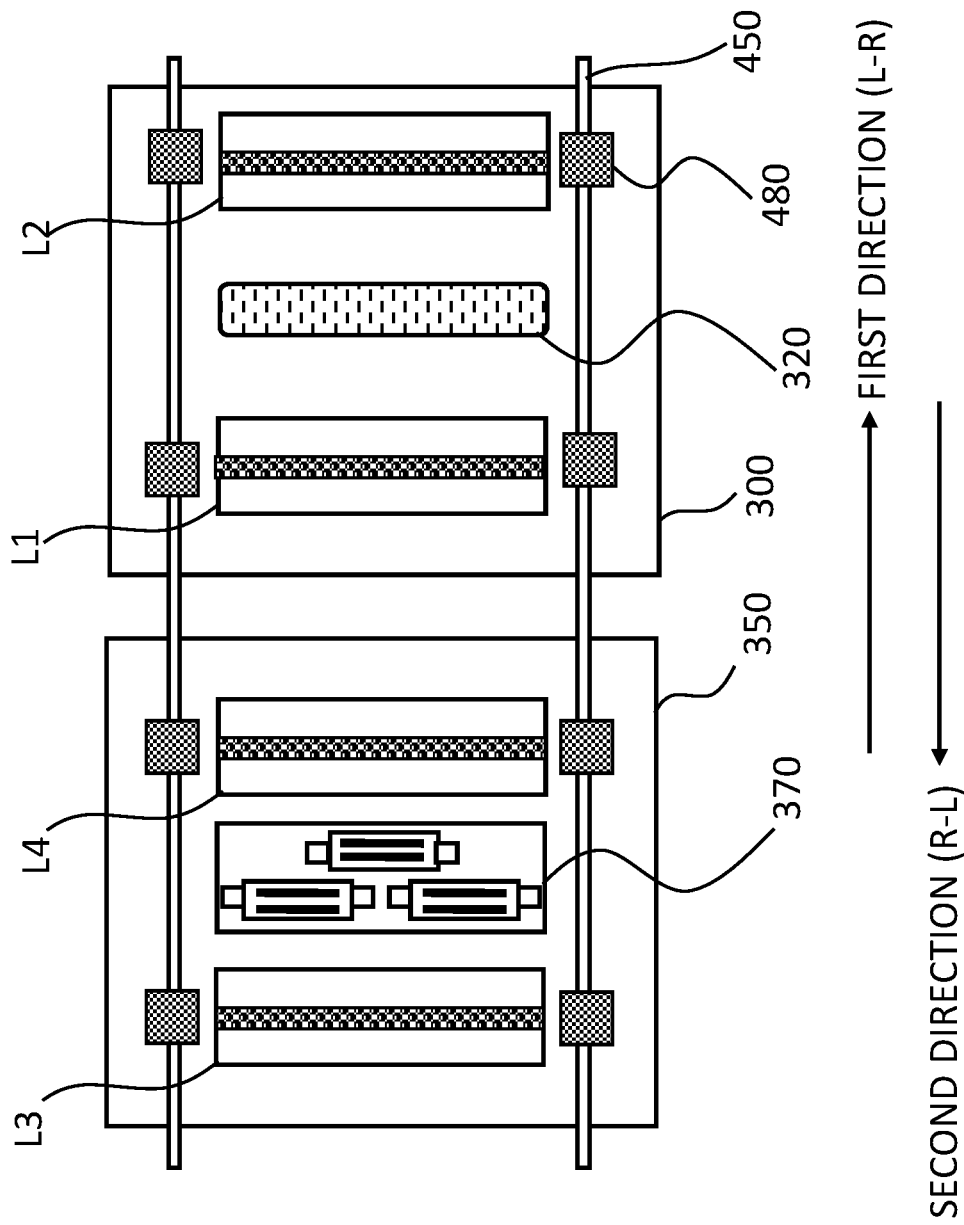
FIG. 6 schematically illustrates the arrangement of a powder distribution sled and a print sled according to a second sled layout "B" (viewed from below)

Turning now to the operation of the powder distribution sled 300 and the print sled 350, FIG. 1 illustrates two independently operable sleds 300, 350 provided above the work surface 170 of the apparatus 1. FIGS. 3 and 6 illustrate two different layouts of the print sled 350 and the powder distribution sled 300. The print sled 350 comprises a first radiation source assembly L3, a second radiation source assembly L4, and one or more droplet deposition heads 370 located between the first and second radiation source assemblies. The powder distribution sled 300 comprises a third radiation source assembly L1, a fourth radiation source assembly L2, and a powder distribution device 320 located between the third and fourth radiation source assemblies. Thus, each sled comprises two radiation source assemblies. Additionally, an overhead radiation source assembly 460 may be provided above the build area 190 in order to pre-heat the powder.

The two different layouts illustrated in FIGS. 3 and 6 will now be described with respect to an apparatus such as illustrated in FIGS. 1 and 2, having an arrangement direction, along the first direction, from the dosing blade 160 on one side of the build area (on the left as illustrated) to the powder return outlet 210 on the opposite side of the build area (on the right as illustrated). This direction from the dosing blade 160 to the powder return outlet 210 (from left towards right as illustrated) will be referred to as the "first direction (L-R)" herein, and the opposite direction (from right towards left as illustrated) will be referred to as the "second direction (R-L)" herein. It will also be appreciated that the references to "left" and "right" herein are merely for ease of understanding with respect to the drawings, and that mirror-image versions of the present apparatus and methods can be made in which the concepts of "left" and "right" are essentially reversed.

As will be described below, each of the arrangements of the sleds illustrated in FIGS. 3 and 6 necessitates a different order in the 3D object manufacturing steps, and each arrangement has its own advantages.

It should be noted that the sled layouts presented in FIGS. 3 and 6 are for illustrative purposes only. These are merely examples of possible sled layouts, and other examples of sled layouts are also envisaged.

FIG. 3 illustrates, in the arrangement direction of FIG. 1, arrangements of the powder distribution sled 300 and the print sled 350 according to a first sled layout "A". FIG. 6 illustrates, in the arrangement direction of FIG. 1, arrangements of the powder distribution sled 300 and the print sled 350 according to a second sled layout "B".

In both the arrangements of FIGS. 3 and 6, the powder distribution sled 300 is operable to distribute a layer of powder within the build area 190 and is driveable in a first direction (left to right as illustrated, i.e. L-R) along a first axis across the build area 190, and is driveable in a second direction (right to left as illustrated, i.e. R-L), opposite to the first direction, along the first axis. That is to say, the powder distribution sled 300 is bi-directionally driveable along the first axis across the build area 190.

In a first example discussed below, the powder distribution sled 300 may move in the first direction (L-R) from a first region A2 (shown in FIG. 4) to a second region A3 (shown in FIG. 4), and may move in the second direction (R-L) from the second region A3 to the first region A2. During the movement of the powder distribution sled 300, the print sled 350 may occupy region A4 (shown in FIG. 4), although it could be elsewhere, as long as it does not impede movement of the powder distribution sled 300.

The print sled 350 is operable to deposit a pattern of fluid onto the layer of powder within the build area 190, to define the geometry of the 3D object in that layer. The print sled 350 is driveable in the first direction (L-R) along a second axis, across the build area 190, and is driveable in the second direction (R-L) along the second axis. That is to say, the print sled 350 is bi-directionally driveable along the second axis across the build area 190. The first axis is parallel to, or coaxial with, the second axis.

Next, in the first example, the print sled 350 may move in the second direction (R-L) from a third region A4 (shown in FIG. 4) across the build area 190, and may next move in the first direction (L-R) across the build area 190 to the third region A4.

The first region A2, the second region A3, the third region A4, and a fourth region A1 are illustrated in FIGS. 4, 5, 7 and 8. However, the positions of these regions are not limited to the positions as illustrated, and the regions may also overlap with each other. For example, the first region A2 and the fourth region A1 may overlap with each other, and the second region A3 and the third region A4 may overlap with each other. More generally, it will be appreciated that the first region A2 and the fourth region A1 are to the left of the build area 190, and the second region A3 and the third region A4 are to the right of the build area 190. For the sled layout of FIG. 3, region A4 may be occupied by the print sled 350 while the powder distribution sled 300 moves across the build area, and region A1 may be occupied by the powder distribution sled 300 while the print sled 350 moves across the build area 190.

As shown in FIGS. 3 and 6, the print sled 350 comprises one or more droplet deposition heads 370 for depositing the fluid, the first radiation source assembly L3 located on one side of the droplet deposition heads 370, in the second direction relative to the droplet deposition heads 370, and the second radiation source assembly L4 located on the other side of the droplet deposition heads 370, in the first direction relative to the droplet deposition heads 370. The powder distribution sled 300 comprises a powder distribution device 320 for distributing a layer of powder, the third radiation source assembly L1 located on one side of the powder distribution device 320, in the second direction relative to the powder distribution device 320, and the fourth radiation source assembly L2 located on the other side of the powder distribution device 320, in the first direction relative to the powder distribution device 320.

Figure 3A:
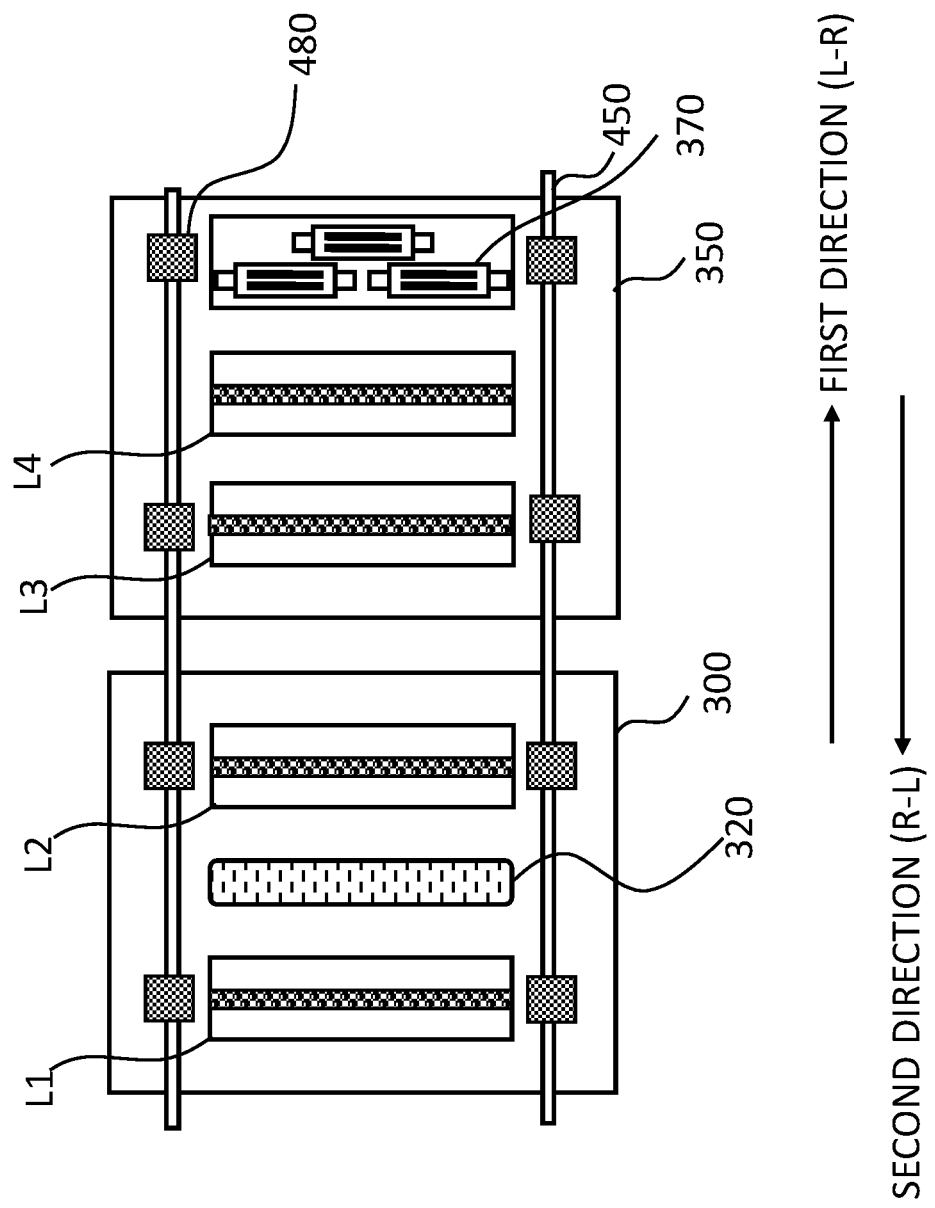
FIG. 3A schematically illustrates the arrangement of a powder distribution sled and a print sled according to a first variant of first sled layout "A" (viewed from below)
Figure 3C:
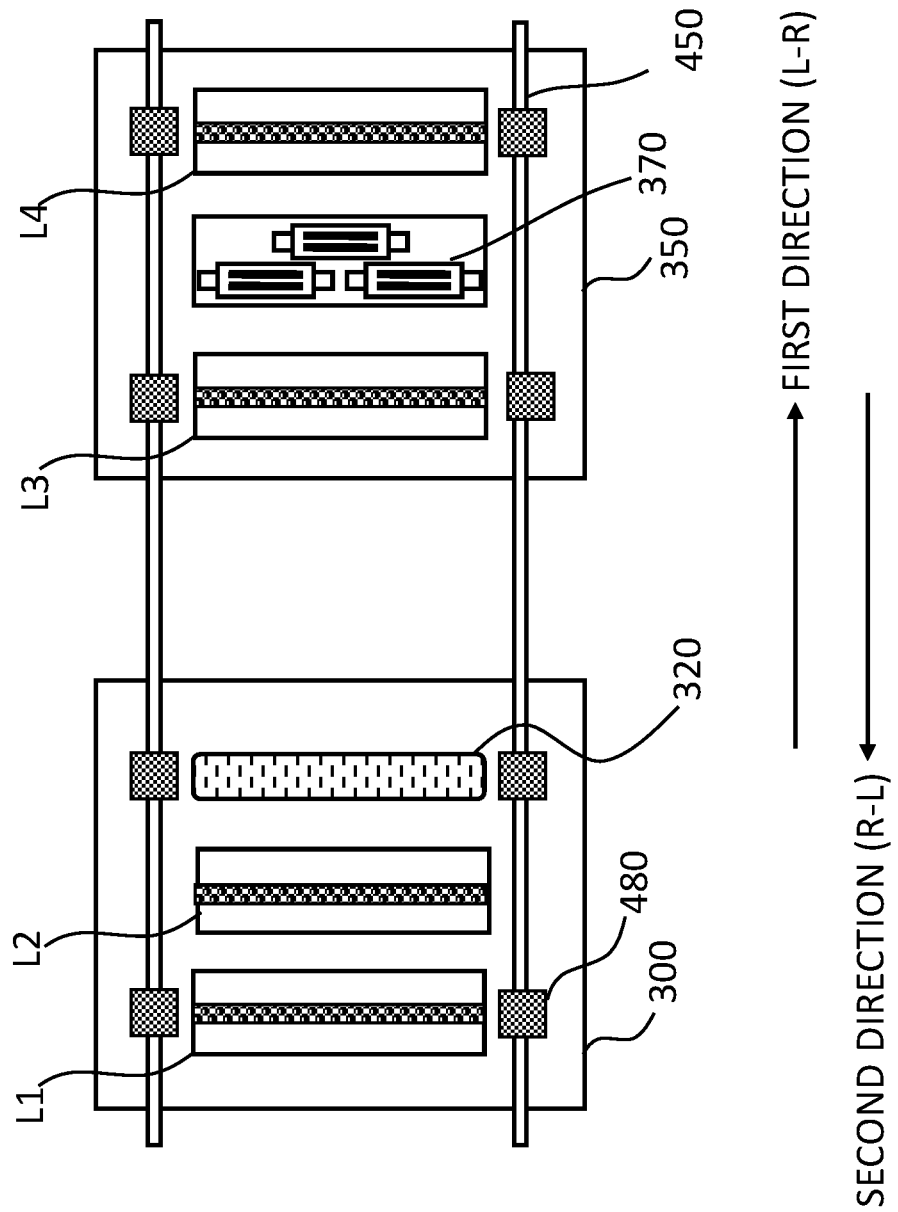
FIG. 3C schematically illustrates the arrangement of a powder distribution sled and a print sled according to a third variant of first sled layout "A" (viewed from below)
Figure 3D:
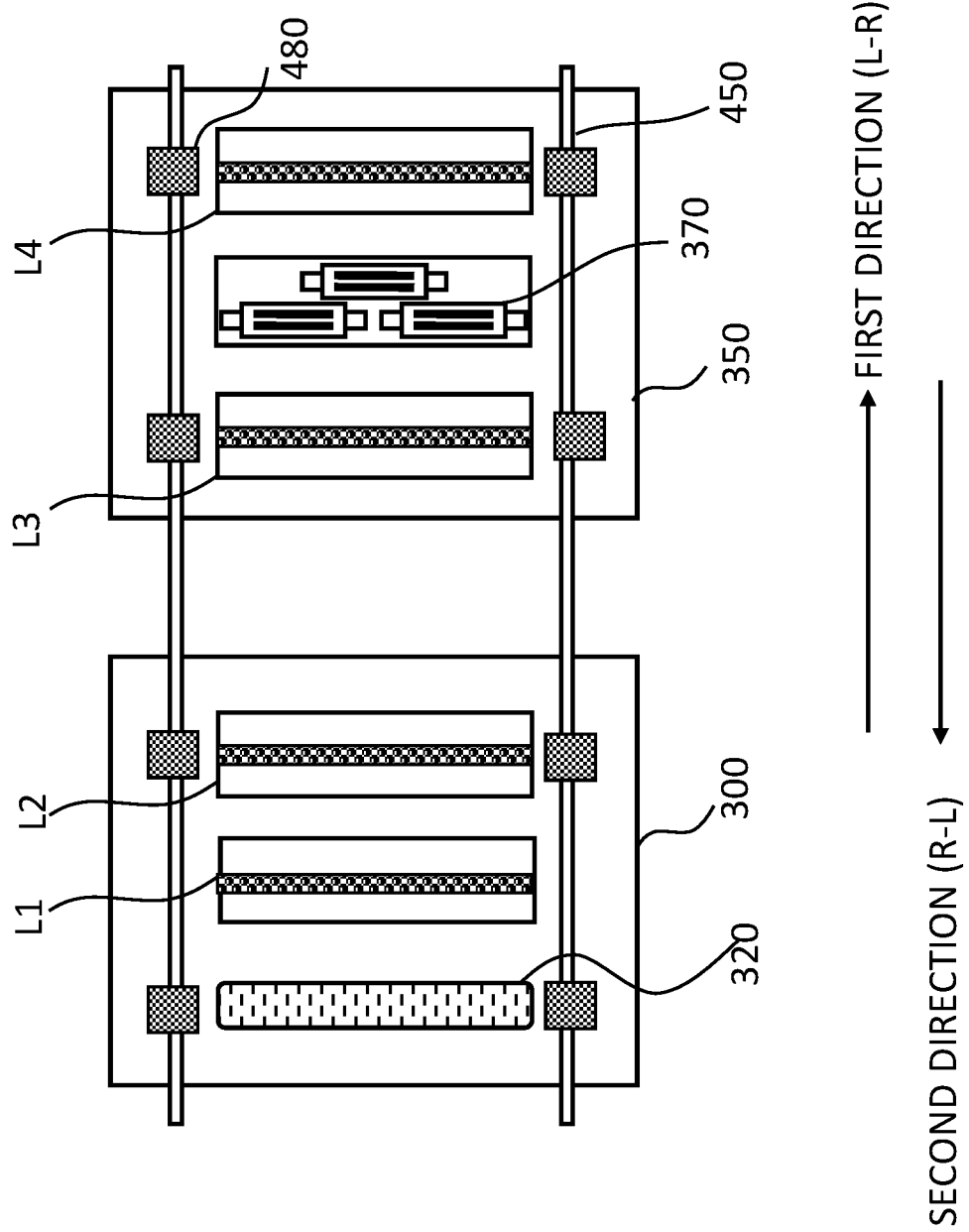
FIG. 3D schematically illustrates the arrangement of a powder distribution sled and a print sled according to a fourth variant of first sled layout "A" (viewed from below)
Figure 3E:
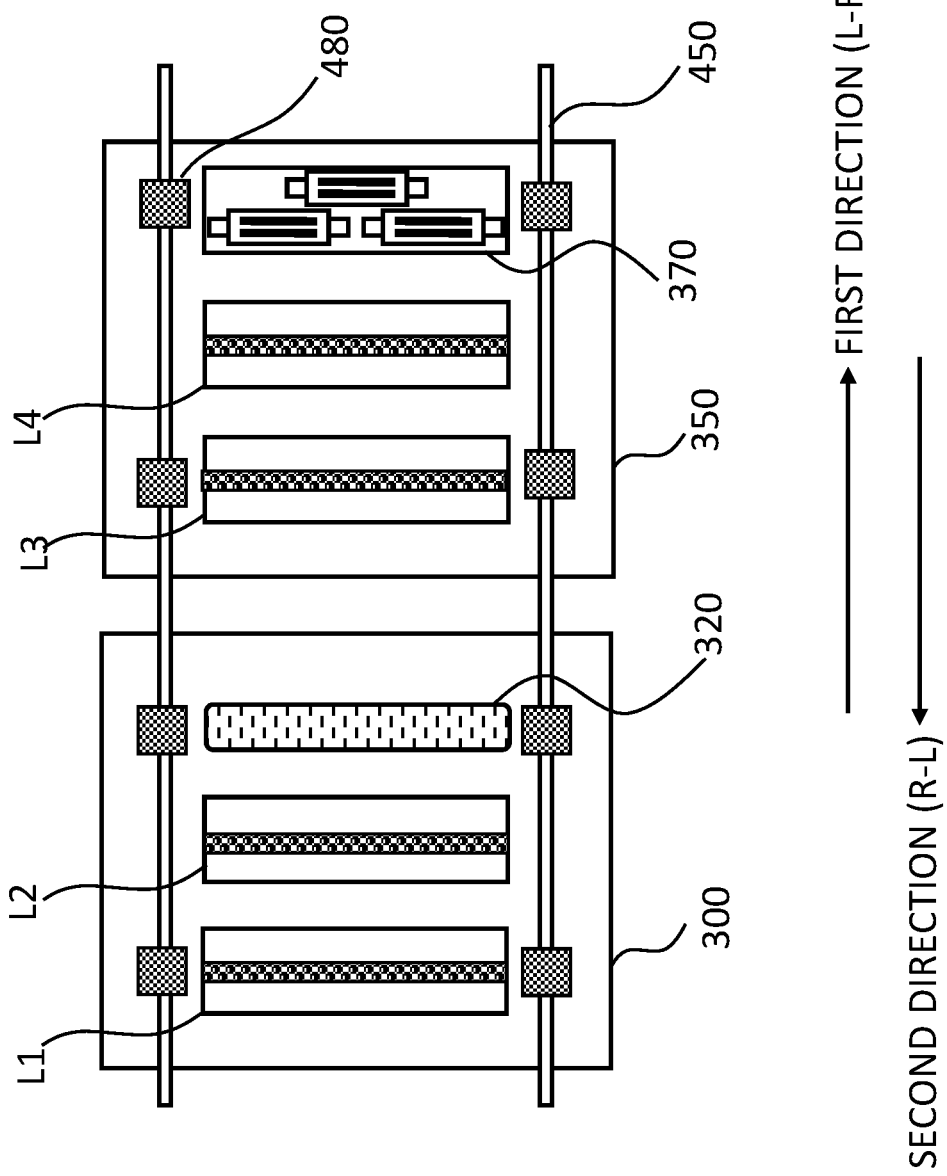
FIG. 3E schematically illustrates the arrangement of a powder distribution sled and a print sled according to a fifth variant of first sled layout "A" (viewed from below)

It should be noted that the print sled 350 and the powder distribution sled 300 in FIGS. 3 and 6 illustrate radiation source assemblies on both sides of the droplet deposition heads and of the powder distribution device. However, the disclosure is not limited to these arrangements, and other arrangements are possible, in any combination. For example, the two (or more) radiation source assemblies L3, L4 may both be arranged on the same side of the droplet deposition heads 370, e.g. in the first direction (as shown in FIG. 3B) or in the second direction (as shown in FIGS. 3A and 3E) relative to the droplet deposition heads 370. Likewise, the two (or more) radiation source assemblies L1, L2 may both be arranged on the same side of the powder distribution device 320, e.g. in the first direction (as shown in FIG. 3D) or in the second direction (as shown in FIGS. 3C and 3E) relative to the powder distribution device 320. Each arrangement provides its own advantages, some of which are described later.

Furthermore, an entire sled can be easily replaced with another sled to achieve a different sled layout. The individual components of a sled can also be replaced with other components. For example, a radiation source assembly may be replaced with droplet deposition heads, a powder distribution device, or a different type of radiation source assembly. Also, individual components may naturally deteriorate over extended use and may be replaced with new components.

In the sled layout arrangement illustrated in FIG. 3, the powder distribution sled 300 is initially arranged to the left of the build area 190 while the print sled 350 is initially arranged to the right of the build area 190. On the other hand, in the sled layout arrangement illustrated in FIG. 6, the powder distribution sled 300 and the print sled 350 are both initially arranged to the left of the build area 190 with the powder distribution sled side nearest the build area.

Apparatus Details

Depending on the application, the first, second, third and fourth radiation source assemblies are configured to preheat and/or sinter the powder within the build area. Preferably, each of the first, second, third and fourth radiation source assemblies may be operable to both preheat and sinter the powder within the build area at different steps of the build process. The wavelength and/or intensity of each radiation source assembly may be adjusted for each preheating and/or each sintering step. Each radiation source assembly may have a different wavelength and/or intensity.

Furthermore, a given radiation source assembly may comprise one or more radiation sources. The one or more radiation sources may be controlled by a controller 550. The controller 550 may control the switching ON/OFF of the each radiation source or may control the output energy of the each radiation source. Moreover, the one or more radiation sources may comprise individual segments which may be individually addressable and may be controlled by the controller 550.

The first, second, third and fourth radiation source assemblies are electromagnetic radiation sources such as infrared radiation sources that may comprise halogen lamps, either in the form of modular sources or a full width single bulb; arrays of light-emitting diodes (LEDs); arrays of laser diodes; arrays of ceramic lamps; arrays of argon lamps; lasers or any other suitable infrared radiation emitter.

The one or more droplet deposition heads 370 for depositing the fluid may be standard drop-on-demand droplet deposition heads suitable for use in a three-dimensional object manufacturing apparatus, such as a Xaar 1003 printhead. The Xaar 1003 printhead for example is able to deposit fluid suspended or soluble in a variety of fluids, and tolerates well the challenging hot and particulate environment of a three-dimensional object printer, due to its effective ink recirculation technology. Furthermore, an insulated housing may be provided around the droplet deposition heads to provide shielding from the heat.

The one or more droplet deposition heads 370 may deposit one or more fluids as described above.

An overhead radiation source assembly 460 may be provided above the build area 190 to provide a uniform temperature on the surface of the build area 190. The overhead radiation source assembly 460 may be a fixed infrared radiation source assembly, such as one or more ceramic IR lamps or any other suitable radiation sources.

Thermal feedback may be provided in order to control the temperature of the build area 190. For example, the temperature of the surface of the build area 190 may be measured with a temperature sensor such as an IR camera, and a feedback loop may be provided to control the operation of the overhead radiation source assembly 460

Returning to FIG. 1, the sleds 300, 350 may be moved across the work surface 170 of the apparatus 1 via motors provided on each sled 300, 350 which may utilise the same drive belt or different drive belts. The apparatus 1 may use a shared drive mechanism or a separate drive mechanism for the drive belts. It should be appreciated that other methods of moving the sleds may be utilised, as known in the art. According to one embodiment, the two sleds 300, 350 are mounted on the same set of rails (i.e. on a common track). According to other embodiments, the two sleds 300, 350 may be mounted on separate rails (i.e. separate parallel tracks). The sets of separate rails may be arranged above one another or alongside one another. According to another embodiment, the two sleds 300, 350 are arranged offset from each other in a direction perpendicular to the direction of movement laterally and/or vertically. Moreover, the two sleds 300, 350 may be independently movable or may in some cases be movable together, in tandem, i.e. essentially as a combined sled. For example, the sleds 300 and 350 in the second sled layout "B" can operate as a combined sled. The movement of the sleds and the timing between the sleds may be controlled by the controller 550. The sleds may typically move at a speed of 200 mm/second.

In order to provide ease of access to the build area 190, the rails 450 may be offset from one another vertically. For example, the rail at the front of the machine may be below the level of the work table 170 to allow easy access to the build chamber 200, whilst the back rail may be above the height of the work table 170 to allow access for maintaining or cleaning the rail.

According to one embodiment, bearings 480 may be provided on both sides of each sled 300, 350, the bearings 480 being moveable orthogonal to the direction of movement of the sleds 300, 350 to allow the sleds 300, 350 to expand or contract with changes in temperature.

The position of the sleds 300, 350 relative to the build area 190 may be monitored by a position sensor provided on each sled 300, 350. The position sensors may be magnetic sensors with a scale mounted on a static part of the machine, a rotary encoder, an optical sensor with a scale mounted on a static part of the machine, laser positioning, etc. Alternatively, a position sensor may be mounted on a static part of the machine, to determine the positions of the sleds 300, 350.

In a presently-preferred embodiment, the dosing blade 160 is arranged between the first region A2 and the build area 190, and the powder return outlet 210 is arranged between the build area 190 and the second region A3.

Methods of Operation

FIGS. 4, 5, 7 and 8 illustrate methods of operation of the apparatus 1 for the manufacture of three dimensional objects. It is known that to achieve an even build area temperature it is beneficial to distribute several buffer layers of powder on the build chamber floor 205, prior to commencing the build, to help mitigate the effects of unevenness in temperature distribution across the surface of the build area 190. This may be done in addition to the base of the build chamber floor 205 being heated.

Reference to "steps" in the methods described below should not be interpreted as necessarily sequential, and may take place simultaneously with one another.

Method 1

A first method for powder distribution, fluid deposition and sintering utilising the sled layout as illustrated in FIG. 3 (with the apparatus of FIGS. 1 and 2) will now be described, with reference to FIG. 4. This method provides four preheat steps and four sinter steps, and hence enables a greater number of total heating exposures compared to the prior art and allows more overall thermal control.

To begin with, the powder distribution sled 300 is located in or near the first region A2, to the left of the build area 190, and to the left of the dosing blade 160. The print sled 350 is located at or near the third region A4, to the right of the build area 190.

Figure 4:
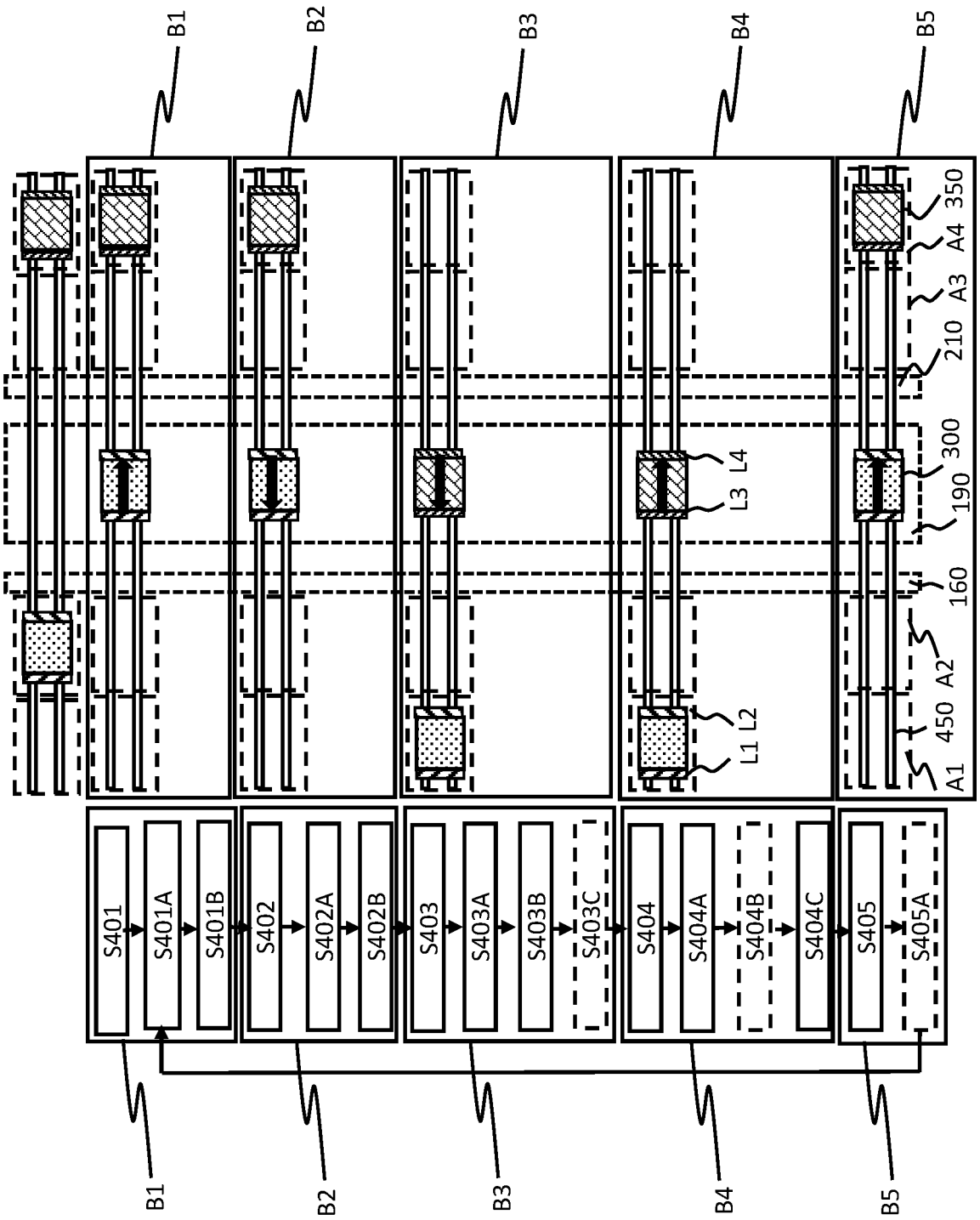
FIG. 4 schematically illustrates a flow diagram of a first 3D manufacturing method using the first sled layout "A"

According to FIG. 4, the build process comprises five different stages B1 to B5, each stage representing the sled movement and associated steps or sub-steps.

First, as a preparatory step, the buffer layers are distributed. Before distributing a new layer of powder for the build process, the build chamber floor 205 may be lowered by the thickness of the layer to be distributed. The dosing blade 160 is rotated to provide a fresh pile of powder to the work surface 170 along the full length of the dosing blade, ready for distribution.

Then the build process begins with a stage B1 which comprises one step S401 of powder distribution sled 300 movement in the first direction (L-R) and two associated sub-steps S401A and S401B. At step S401, the powder distribution sled 300 is driven in the first direction (L-R) from the first region A2 towards the second region A3, over the dosing blade 160 and simultaneously causing a layer of powder to be distributed across the build area 190 by the powder distribution device 320 at sub-step S401A, as a first layer in the build process. At the same time, at sub-step S401B, the third radiation source assembly L1 may be activated to preheat (Preheat step 1) the dosed powder as it is distributed. Any excess powder is fed to the powder return outlet 210 as the powder distribution sled 300 reaches the second region A3, at the right of the build area 190. The build chamber floor 205 may be lowered again, so that, in the event that the powder distribution device 320 is fixed in height and cannot be lifted, it is possible to make sure that the powder distribution device 320 does not contact the underlying powder layer during the next step S402 wherein the powder distribution sled 300 is moved in the opposite direction.

Then, the next stage B2 comprises one step S402 of powder distribution sled 300 movement in the second direction (R-L) and two associated sub-steps S402A and S402B. At step S402, the powder distribution sled 300 is driven in the second direction (R-L) from the second region A3 towards the fourth region A1. During this movement of powder distribution sled 300, the third radiation source assembly L1 may be activated to preheat (Preheat step 2) the layer of powder at sub-step S402A, and at sub-step S402B the fourth radiation source assembly L2 may be activated to preheat (Preheat step 3) the layer of the powder.

The next stage B3 comprises one step S403 of print sled 350 movement in the second direction (R-L) and three associated sub-steps S403A, S403B and S403C. At step S403, the print sled 350 is driven in the second direction (R-L) from the third region A4 towards the first region A2 (but, depending on what needs to be printed, not necessarily all the way to the first region A2). Before step S403, the build chamber floor 205 may be slightly elevated after the powder distribution sled 300 has passed across the build area in step S402, to bring the powder layer surface closer to the droplet deposition heads 370 so as to avoid any droplet deviation in the step S503. As the print sled 350 moves across the build area 190, at sub-step S403A the first radiation source assembly L3 may be activated to preheat (Preheat step 4) the layer of powder, and at sub-step S403B the droplet deposition heads 370 may deposit the fluid such as radiation absorbing material (RAM). At the same time, at sub-step S403C, the second radiation source assembly L4 may be activated to sinter (Sinter step 1) the parts of the layer on which the fluid was deposited during sub-step S403B.

The next stage B4 comprises one step S404 of print sled 350 movement in the first direction (L-R) and three associated sub-steps S404A, S404B and S404C. At step S404, the print sled 350 is driven in the first direction (L-R) from the first region A2 (or as far across the build area as the print sled 350 has travelled) back towards the third region A4. During this pass, at sub-step S404A, the second radiation source assembly L4 may be activated to sinter (Sinter step 2) the parts of the layer on which the fluid was deposited during sub-step S403B, and at sub-step S404B, the droplet deposition heads 370 may deposit the same fluid. Alternatively, during this pass, the droplet deposition heads 370 may deposit a different or second fluid which may have a different colour or may have different properties. For example, the second fluid may be a non-sinter-promoting fluid and may enhance the edge definitions of the object. Sometimes, the sub-step S404B is advantageous if there are defective or non-uniform nozzles of the droplet deposition head. The nozzles of the droplet deposition head may be shifted in a transverse direction from the printing direction and another layer of fluid deposited to avoid dislocations through a finished part.

In this first direction (L-R) of the print sled 350, the first radiation source assembly L3 may be activated at sub-step S404C, to sinter (Sinter step 3) the parts of the layer on which the fluid was deposited during sub-step S403B and/or sub-step S404B.

Once the print sled 350 is clear of the dosing blade 160 during step S404, or, if preferred, after the print sled 350 has arrived at or near the third region A4, the dosing blade 160 is rotated again, and a fresh pile of powder brought up to the work surface 170, along the full length of the dosing blade 160, ready for distribution.

The next stage B5 comprises one step S405 of powder distribution sled movement in the first direction (L-R) and one associated sub-step S405A. At step S405, the powder distribution sled 300 is driven in the first direction (L-R), towards the second region A3 from the fourth region A1. The fourth radiation source assembly L2 may be activated at sub-step S405A to sinter (Sinter step 4) the parts of the layer on which the fluid was deposited during sub-step S403B and/or sub-step S404B. The process then repeats from sub-step S401A with the powder distribution device 320 distributing the next layer of powder, until the desired object is manufactured.

The capability/ability of immediate distribution (sub-step S401A) of the next layer of powder by the powder distribution device 320, after the sinter step (sub-step S405A) performed by the fourth radiation source assembly L2, during a single pass (L-R) of sled 300, can be used to maximise bonding/fusion between the sintered particles in one layer and those in the next layer, therefore maximising the intra- and inter-layer strength of the 3D object in the z-direction, and providing consistent intra- and inter-layer bonding across the width of the build area. Thus, this method is useful to ensure good bonding between the two layers as the steps of sintering, powder distribution and preheating are possible immediately one after another.

As can be seen from the above method, the first radiation source assembly L3 and the fourth radiation source assembly L2 may function as both a preheat source and a sinter source. On the other hand, the second radiation source assembly L4 may be used for sintering only, and the third radiation source assembly L1 may be utilized for preheating only.

Method 2

A second method for powder distribution, fluid deposition and sintering utilising the sled layout as illustrated in FIG. 3 (with the apparatus of FIGS. 1 and 2) will now be described, with reference to FIG. 5. This method provides six preheat steps and two sinter steps and hence enables a greater number of pre-heating exposures for distributed powder prior to sintering compared to the prior art and allows more overall thermal control.

To begin with, the powder distribution sled 300 is located in or near the first region A2, to the left of the build area 190, and to the left of the dosing blade 160. The print sled 350 is located at or near the third region A4, to the right of the build area 190.

Figure 5:
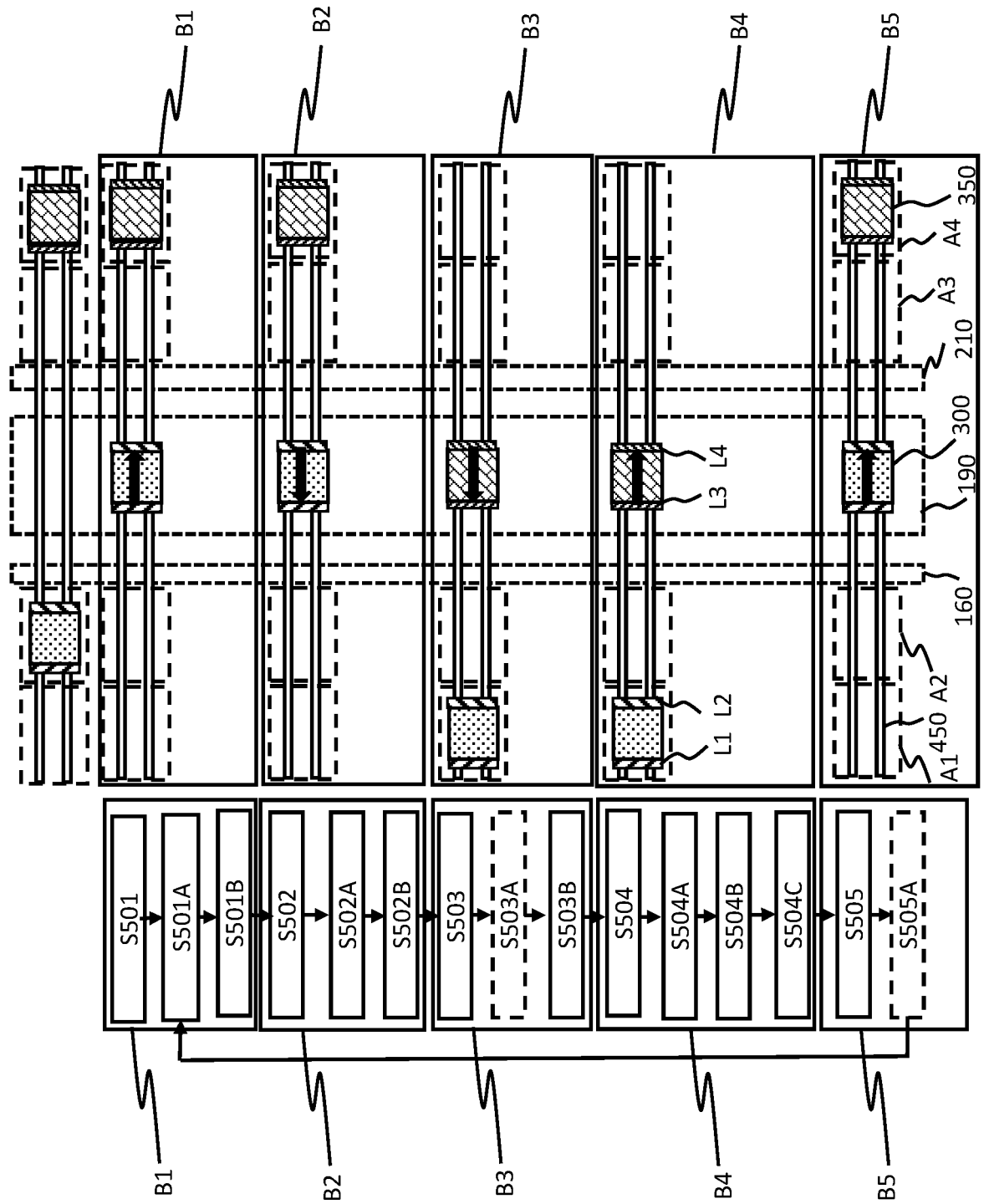
FIG. 5 schematically illustrates a flow diagram of a second 3D manufacturing method using the first sled layout "A"

According to FIG. 5, the build process comprises five different stages B1 to B5, each stage representing the sled movement and associated steps or sub-steps.

First, as a preparatory step, the buffer layers are distributed. Before distributing a new layer of powder for the build process, the build chamber floor 205 may be lowered by the required thickness of the layer to be distributed. The dosing blade 160 is rotated to provide a fresh pile of powder to the work surface 170 along the full length of the dosing blade, ready for distribution.

Then the build process begins with a stage B1 which comprises one step S501 of powder distribution sled 300 movement in the first direction (L-R) and two associated sub-steps S501A and S501B. At step S501, the powder distribution sled 300 is driven in the first direction (L-R) from the first region A2 towards the second region A3, over the dosing blade 160 and simultaneously causing a layer of powder to be distributed across the build area 190 by the powder distribution device 320 at sub-step S501A, as a first layer in the build process. At the same time, at sub-step S501B, the third radiation source assembly L1 may be activated to preheat (Preheat step 1) the dosed powder as it is distributed. Any excess powder is fed to the powder return outlet 210 as the powder deposition sled 300 reaches the second region A3, at the right of the build area 190. The build chamber floor 205 may be lowered again, so that, in the event that the powder distribution device 320 is fixed in height and cannot be lifted, it is possible to make sure that the powder distribution device 320 does not contact the underlying powder layer during the next step S502 wherein the powder distribution sled 300 is moved in the opposite direction.

Then, the next stage B2 comprises one step S502 of powder distribution sled 300 movement in the second direction (R-L) and associated two sub-steps S502A and S502B. At step S502, the powder distribution sled 300 is driven in the second direction (R-L) from the second region A3 towards the fourth region A1. During this movement of powder distribution sled 300, the third radiation source assembly L1 may be activated to preheat (Preheat step 2) the layer of powder at sub-step S502A, and at sub-step S503B the fourth radiation source assembly L2 may be activated to preheat (Preheat step 3) the layer of powder.

The next stage B3 comprises one step S503 of print sled 350 movement in the second direction (R-L) and associated two sub-steps S503A and S503B. At step S503, the print sled 350 is operated in the second direction (R-L) from the third region A4 towards the first region A2 (but, depending on what needs to be printed, not necessarily all the way to the first region A2). Before step S503, the build chamber floor 205 may be elevated slightly after the powder distribution sled 300 has passed across the build area in step S502, to bring the powder layer surface closer to the droplet deposition heads 370 so as to avoid any droplet deviation in the step S503. As the print sled 350 moves across the build area 190, at sub-step S503A, the first radiation source assembly L3 may be activated to preheat (Preheat step 4) the layer of powder. In this movement of the print sled 350, the droplet deposition heads 370 may not deposit the fluid. At sub-step S503B, the second radiation source assembly L4 may be activated to preheat (Preheat step 5) the layer of powder.

The next stage B4 comprises one step S504 of print sled 350 movement in the first direction (L-R) and associated three sub-steps S504A, S504B and S504C. At step S504, the print sled 350 is moved in the first direction (L-R) from the first region A2 (or as far across the build area as the print sled 350 has travelled) back towards the third region A4. During this pass, at sub-step S504A, the second radiation source assembly L4 may be activated to preheat (Preheat step 6) the layer of powder. During this movement, the droplet deposition heads 370 deposit the fluid at sub-step S504B. The immediate succession of sub-steps S504A and S504B, performed during a single pass (L-R) of the print sled 350, ensures that fluid deposition occurs immediately and with a consistent delay after preheating step. Also, significant cooling of the powder may be avoided due to the time elapsed after preheating is short, so that the fluid is deposited onto a uniformly heated powder layer. In this first direction (L-R) of the print sled 350 and during the same single pass (L-R) of the print sled 350, the first radiation source assembly L3 may be activated at sub-step S504C, to sinter (Sinter step 1) the parts of the layer on which the fluid was deposited during sub-step S504B. Thus, preheating, fluid deposition and sintering of the powder may all be performed by the print sled 350 in that single pass (L-R), minimising cooling of the powder between the various sub-steps.

Once the print sled 350 is clear of the dosing blade 160 during step S504, or, if preferred, after the print sled 350 has arrived at or near the third region A4, the dosing blade 160 is rotated again, and a fresh pile of powder brought up to the work surface 170, along the full length of the dosing blade 160, ready for distribution.

The next stage B5 comprises one step S505 of powder distribution sled 300 movement in the first direction (L-R) and one associated sub-step S505A. At step S505, the powder distribution sled 300 is driven in the first direction (L-R) towards the second region A3 from the fourth region A1. The fourth radiation source assembly L2 may be activated at sub-step S505A to sinter (Sinter step 2) the parts of the layer on which the fluid was deposited during sub-step S504B. The process then repeats from sub-step S501A with the powder distribution device 320 distributing the next layer of powder, until the desired object is manufactured.

As with Method 1, the capability/ability of immediate distribution (sub-step S501A) of the next layer of powder by the powder distribution device 320, after the sinter step (sub-step S505A) performed by the fourth radiation source assembly L2, during a single pass (L-R) of sled 300, can be used to maximise bonding/fusion between the sintered particles in one layer and those in the next layer, therefore maximising the intra- and inter-layer strength of the 3D object in the z-direction, and providing consistent intra- and inter-layer bonding across the width of the build area. Thus, this method is useful to ensure good bonding between the two layers as the steps of sintering, powder distribution and preheating are possible immediately one after another.

In the above method, the first radiation source assembly L3 and the fourth radiation source assembly L2 may function as both a preheat source and a sinter source. On the other hand, the second radiation source assembly L4 and the third radiation source assembly L1 may be utilized for preheating only.

Method 3

A first method for powder distribution, fluid deposition and sintering utilising the sled layout as illustrated in FIG. 6 (with the apparatus of FIGS. 1 and 2) will now be described, with reference to FIG. 7. This method provides two preheat steps and six sinter steps, and hence enables a greater number of heating exposures to the fluid compared to the prior art, and allows more energy to be delivered to sinter the powder in areas where fluid was deposited for good intra-layer and inter-layer bonding strength.

To begin with, the powder distribution sled 300 and the print sled 350 are both located to the left of the build area 190, in or near the first region A2 and the fourth region A1 respectively, to the left of the build area 190, and to the left of the dosing blade 160.

According to FIG. 7, the build process comprises five different stages B1 to B5, each stage representing the sled movement and associated steps or sub-steps.

First, as a preparatory step, the buffer layers are distributed. Before distributing a new layer of powder for the build process, the build chamber floor 205 may be lowered by the thickness of the layer to be distributed. The dosing blade 160 is rotated to provide a fresh pile of powder to the work surface 170 along the full length of the dosing blade, ready for distribution.

Then the build process begins with a stage B1 which comprises one step S701 of powder distribution sled 300 movement in the first direction (L-R) and two associated sub-steps S701A and S701B. At step S701, the powder distribution sled 300 is driven in the first direction (L-R) from the first region A2 towards the third region A4, over the dosing blade 160 and simultaneously causing a layer of powder to be distributed across the build area 190 by the powder distribution device 320 at sub-step S701A, as a first layer in the build process. At the same time, at sub-step S701B, the third radiation source assembly L1 may be activated to preheat (Preheat step 1) the dosed powder as it is distributed. Any excess powder is fed to the powder return outlet 210 as the powder distribution sled 300 sled enters the second region A3, at the right of the build area 190.

Then, the next stage B2 comprises one step S702 of print sled 350 movement in the first direction (L-R) and three associated sub-steps S702A, S702B and S702C. At step S702, the print sled 350 is driven across the build area 190 in the first direction (L-R), from the fourth region A1 towards the second region A3 (but, depending on what needs to be printed, not necessarily all the way to the second region A3). During this movement of the print sled 350, at sub-step S702A the second radiation source assembly L4 may be activated to preheat (Preheat step 2) the powder, at sub-step S702B the droplet deposition heads 370 may deposit the fluid, and at sub-step S702C the first radiation source assembly L3 may be activated to sinter (Sinter step 1) the parts of the layer on which the fluid was deposited during sub-step S702B. Thus, preheating, fluid deposition and sintering of the powder may all be performed by the print sled 350 in that single pass (L-R), minimising cooling of the powder between the sub-steps.

The next stage B3 comprises one step S703 of print sled 350 movement in the second direction (R-L) and three associated sub-steps S703A, S703B and S703C. At step S703, the print sled 350 is driven in the second direction (R-L) from the second region A3 (or as far across the build area as the print sled 350 has travelled), back towards the fourth region A1. During this travel, at sub-step S703A the first radiation source assembly L3 may be activated to sinter (Sinter step 2) the parts of the layer on which the fluid was deposited during sub-step S702B, and at sub-step S703B the droplet deposition heads may deposit the same fluid. Alternatively, during this pass, the droplet deposition heads 370 may deposit a different or second fluid which may have a different colour or may have different properties. For example, the second fluid may be a non-sinter-promoting fluid and may enhance the edge definitions of the object. Sometimes, the sub-step S703B is advantageous if there are defective or non-uniform nozzles of the droplet deposition head. The nozzles of the droplet deposition head may be shifted in a transverse direction from the printing direction and another layer of fluid deposited to avoid dislocations through a finished part.

In this second direction (R-L) of print sled 350, the second radiation source assembly L4 may be activated at sub-step S703C to sinter (Sinter step 3) the parts of the layer on which the fluid was deposited during sub-step S702B and/or sub-step S703B.

Then the build chamber floor 205 may be slightly lowered so that, in the event that the powder distribution device 320 is fixed in height and cannot be lifted, it is possible to make sure the powder distribution device 320 does not contact the underlying powder layer during the next step S704 wherein the powder distribution sled 300 is moved in the opposite direction.

The next stage B4 comprises one step S704 of powder distribution sled 300 movement in the second direction (R-L) and two associated sub-steps S704A and S704B. At step S704, the distribution sled 300 is driven in the second direction (R-L) from the third region A4 back towards the first region A2. During this movement, at sub-step S704A, the third radiation source assembly L1 may be activated to sinter (Sinter step 4) the parts of the layer on which the fluid was deposited during sub-step S702B and/or sub-step S703B, and at sub-step S704B, the fourth radiation source assembly L2 may be activated to sinter (Sinter step 5) the parts of the layer on which the fluid was deposited during sub-step S702B and/or sub-step S703B.

The build chamber floor 205 may be slightly elevated according to the required layer thickness and the dosing blade 160 is rotated to provide a pile of powder for the next layer.

The next stage B5 comprises one step S705 of powder distribution sled 300 movement in the first direction (L-R) and one associated sub-step S705A. At step S705, the powder distribution sled 300 is driven in the first direction (L-R) from the first region A2 towards the third region A4. During this movement, the fourth radiation source assembly L2 may be activated at sub-step S705A, to sinter (Sinter step 6) the parts of the layer on which the fluid was deposited during sub-step S702B and/or sub-step S703B. The process then repeats from sub-step S701A with the powder distribution device 320 distributing the next layer of powder, until the desired object is manufactured.

As with Methods 1 and 2 above, the capability/ability of immediate distribution (sub-step S701A) of the next layer of powder by the powder distribution device 320, after the sinter step (sub-step S705A) performed by the fourth radiation source assembly L2, during a single pass (L-R) of sled 300, can be used to maximise bonding/fusion between the sintered particles in one layer and those in the next layer, therefore maximising the intra- and inter-layer strength of the 3D object in the z-direction, and providing consistent intra- and inter-layer bonding across the width of the build area. Thus, this method is useful to ensure good bonding between the two layers as the steps of sintering, powder distribution and preheating are possible immediately one after another.

In the above method, the second radiation source assembly L4 and the third radiation source assembly L1 may function as both a preheat source and a sinter source. On the other hand, the fourth radiation source assembly L2 and the first radiation source assembly L3 may be used for sintering only.

Method 4

A second method for powder distribution, fluid deposition and sintering utilising the sled layout as illustrated in FIG. 6 (with the apparatus of FIGS. 1 and 2) will now be described, with reference to FIG. 8. This method provides four preheat steps and four sinter steps, and hence enables a greater number of heating exposures compared to the prior art and allows more overall thermal control.

To begin with, the powder distribution sled 300 and the print sled 350 are both located to the left of the build area 190, in or near the first region A2 and the fourth region A1 respectively, to the left of the build area 190, and to the left of the dosing blade 160.

According to FIG. 8, the build process comprises five different stages B1 to B5, each stage representing the sled movement and associated steps or sub-steps.

First, as a preparatory step, the buffer layers are distributed. Before distributing a new layer of powder for the build process, the build chamber floor 205 may be lowered by the thickness of the layer to be distributed. The dosing blade 160 is rotated to provide a fresh pile of powder to the work surface 170 along the full length of the dosing blade, ready for distribution.

Then the build process begins with a stage B1 which comprises one step S801 of powder distribution sled 300 movement in the first direction (L-R) and two associated sub-steps S801A and S801B. At step S801, the powder distribution sled 300 is driven in the first direction (L-R) from the first region A2 towards the third region A4, over the dosing blade 160 and simultaneously causing the powder distribution device 320 to distribute at sub-step S801A a first layer in the build process. At the same time, a sub-step S801B the third radiation source assembly L1 may be activated to preheat (Preheat step 1) the dosed powder as it is distributed. Any excess powder is fed to the powder return outlet 210 as the powder distribution sled 300 sled enters the second region A3, at the right of the build area 190.

The next stage B2 comprises one step S802 of print sled 350 movement in the first direction (L-R) and two associated sub-steps of S802A and S802B. At step S802, the print sled 350 is driven across the build area 190 in the first direction (L-R), from the fourth region A1 towards the second region A3 (but, depending on what needs to be printed, not necessarily all the way to the second region A3). During this movement of the print sled 350, at sub-step S802A the second radiation source assembly L4 may be activated to preheat (Preheat step 2) the layer of powder, and at sub-step S802B the first radiation source assembly L3 may be activated to preheat (Preheat step 3) the layer of powder. The droplet deposition heads may or may not deposit the fluid during this pass of the print sled.

The next stage B3 comprises one step S803 of print sled 350 movement in the second direction (R-L) and three associated sub-steps of S803A, S803B and S803C. At step S803, the print sled 350 is driven in the second direction (R-L) from the second region A3 (or as far across the build area as the print sled 350 has travelled) back towards the fourth region A1. During this movement, at sub-step S803A the first radiation source assembly L3 may be activated to preheat (Preheat step 4) the layer of powder, at sub-step S803B the droplet deposition heads 370 may deposit the fluid in accordance with the image data for that layer, and at sub-step S803C the second radiation source assembly L4 may be activated to sinter (Sinter step 1) the parts of the layer on which the fluid was deposited during sub-step S803B. Thus, preheating, fluid deposition and sintering of the powder may all be performed by the print sled 350 in that single pass (R-L), minimising cooling of the powder between the steps.

Then the build chamber floor 205 may be slightly lowered so that, in the event that the powder distribution device 320 is fixed in height and cannot be lifted, it is possible to make sure the powder distribution device 320 does not contact the underlying powder layer during the next step S804 wherein the powder distribution sled 300 is moved in the opposite direction.

The next stage B4 comprises one step S804 of powder distribution sled 300 movement in the second direction (R-L) and two associated sub-steps S804A and S804B. At step S804, the powder distribution sled 300 is driven in the second direction (R-L) from the third region A4 back towards the first region A2. During this travel, at sub-step S804A, the third radiation source assembly L1 may be activated to sinter (Sinter step 2) the parts of the layer on which the fluid was deposited during sub-step S803B, and at sub-step S804B the fourth radiation source assembly L2 may also be activated to sinter (Sinter step 3) the parts of the layer on which the fluid was deposited during sub-step S803B.

The build chamber floor 205 may be slightly elevated according to the required layer thickness and the dosing blade 160 is rotated to provide a pile of powder for the next layer.

The next stage B5 comprises one step S805 of powder distribution sled 300 movement in the first direction (L-R) and one associated sub-step S805A. At step S805 the powder distribution sled 300 is driven in the first direction (L-R) from the first region A2 towards the third region A4. During this movement, the fourth radiation source assembly L2 may be activated at sub-step S805A to sinter (Sinter step 4) the parts of the layer on which the fluid was deposited during sub-step S803B. The process then repeats from sub-step S801A with the powder distribution device 320 distributing the next layer of powder, until the desired object is manufactured.

As with Methods 1, 2 and 3 above, the capability/ability of immediate distribution (sub-step S801A) of the next layer of powder by the powder distribution device 320, after the sinter step (sub-step S805A) performed by the fourth radiation source assembly L2, during a single pass (L-R) of sled 300, can be used to maximise bonding/fusion between the sintered particles in one layer and those in the next layer, therefore maximising the intra- and inter-layer strength of the 3D object in the z-direction, and providing consistent intra- and inter-layer bonding across the width of the build area. Thus, this method is useful to ensure good bonding between the two layers as the steps of sintering, powder distribution and preheating are possible immediately one after another.

In the above method, the second radiation source assembly L4 and the third radiation source assembly L1 may function as both a preheat source and a sinter source. On the other hand, the fourth radiation source assembly L2 may be used for sintering only, and the first radiation source assembly L3 may be utilized for preheating only.

Variants

It should be noted that the methods outlined in FIGS. 4, 5, 7 and 8 are offered merely as examples of possible methods with the sled layouts shown in FIGS. 3 and 6. However, different combinations or re-arrangements of the sled layouts may be possible, and other examples of methods are also envisaged. Each combination may have its own benefits. Moreover, it is possible to independently change the timing between the sleds to optimise bonding between layers, due to the sinter step occurring just before the next powder distribution step.

Figure 6A:
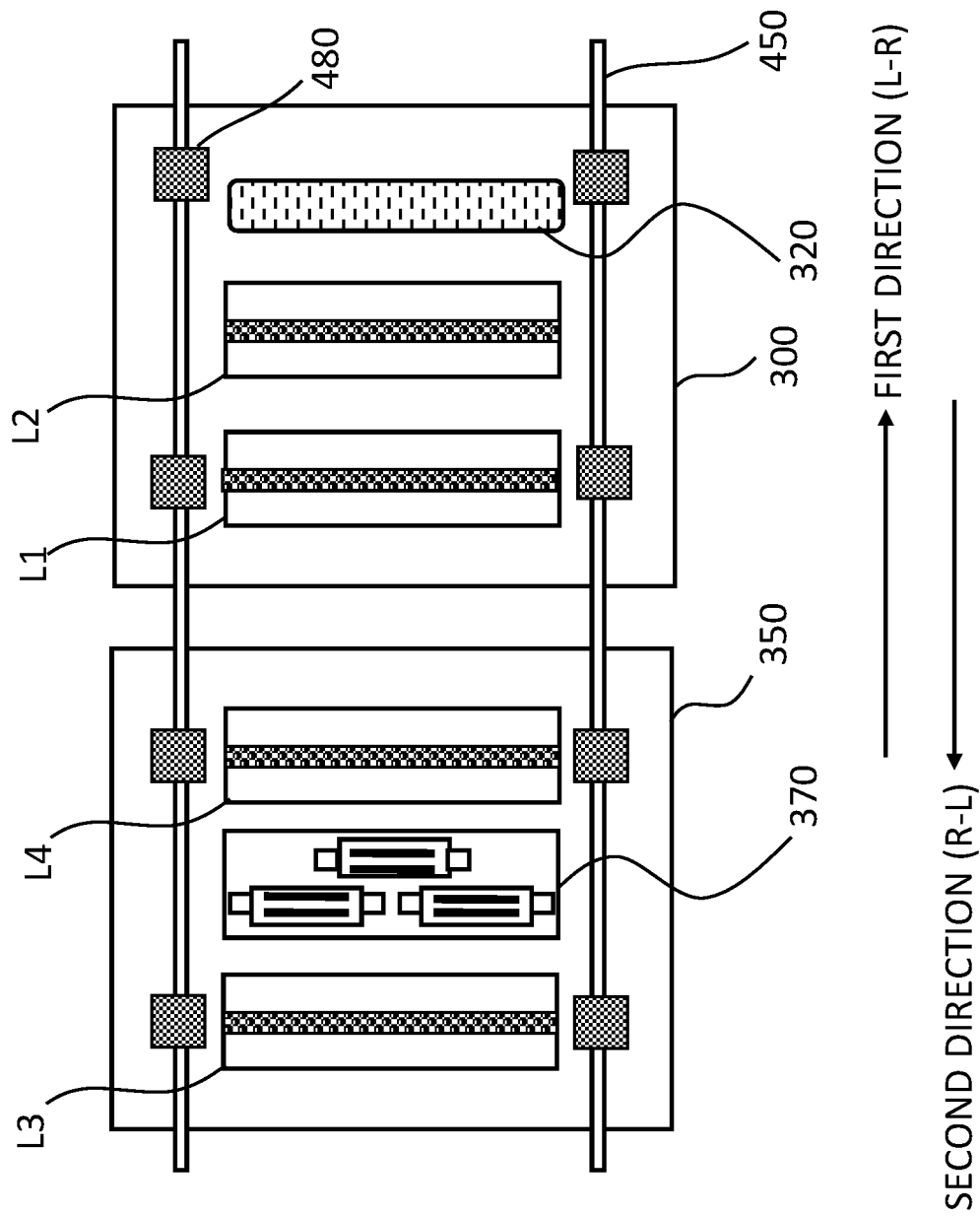
FIG. 6A schematically illustrates the arrangement of a powder distribution sled and a print sled according to a first variant of second sled layout "B" (viewed from below)

In one example (shown in FIGS. 3C and 6A), the powder distribution sled 300 may comprise a powder distribution device 320 and the two radiation source assemblies L1, L2 both located on one side of the powder distribution device 320, in the second direction relative to the powder distribution device 320. This arrangement of two radiation source assemblies side by side may be useful for powder materials which require higher intensity radiation to preheat and/or sinter as the second radiation source assembly may be activated to supplement the first radiation source assembly. The print sled 350 may comprise droplet deposition heads 370 and radiation source assemblies L3, L4 on both sides of the droplet deposition heads 370. With this combination, it may be possible to achieve five sinter steps and three preheat steps. The method allows multiple fluid deposition and sinter steps to occur, which is advantageous if depositing the (cold) fluid causes preceding layers to cool and warp upwards. In this case, the first fluid deposition pass may be used to print only a small amount of fluid so that cooling or warping does not occur. Then, first and second sinter steps may be used to heat the parts of the layer on which the fluid was deposited, so that on the second fluid deposition pass it is possible to add more fluid without cooling the layer too much such that warping does not occur. This method may also be beneficial for powder materials with a small super-cooling process window and/or for large flat objects. The above combination may also result in seven preheat steps and one sinter step, which is advantageous for powder materials that require close thermal control of the build bed, or for materials where the powder needs to be deposited cold for easy flow and then heated up to be ready for sintering.

Figure 6C:
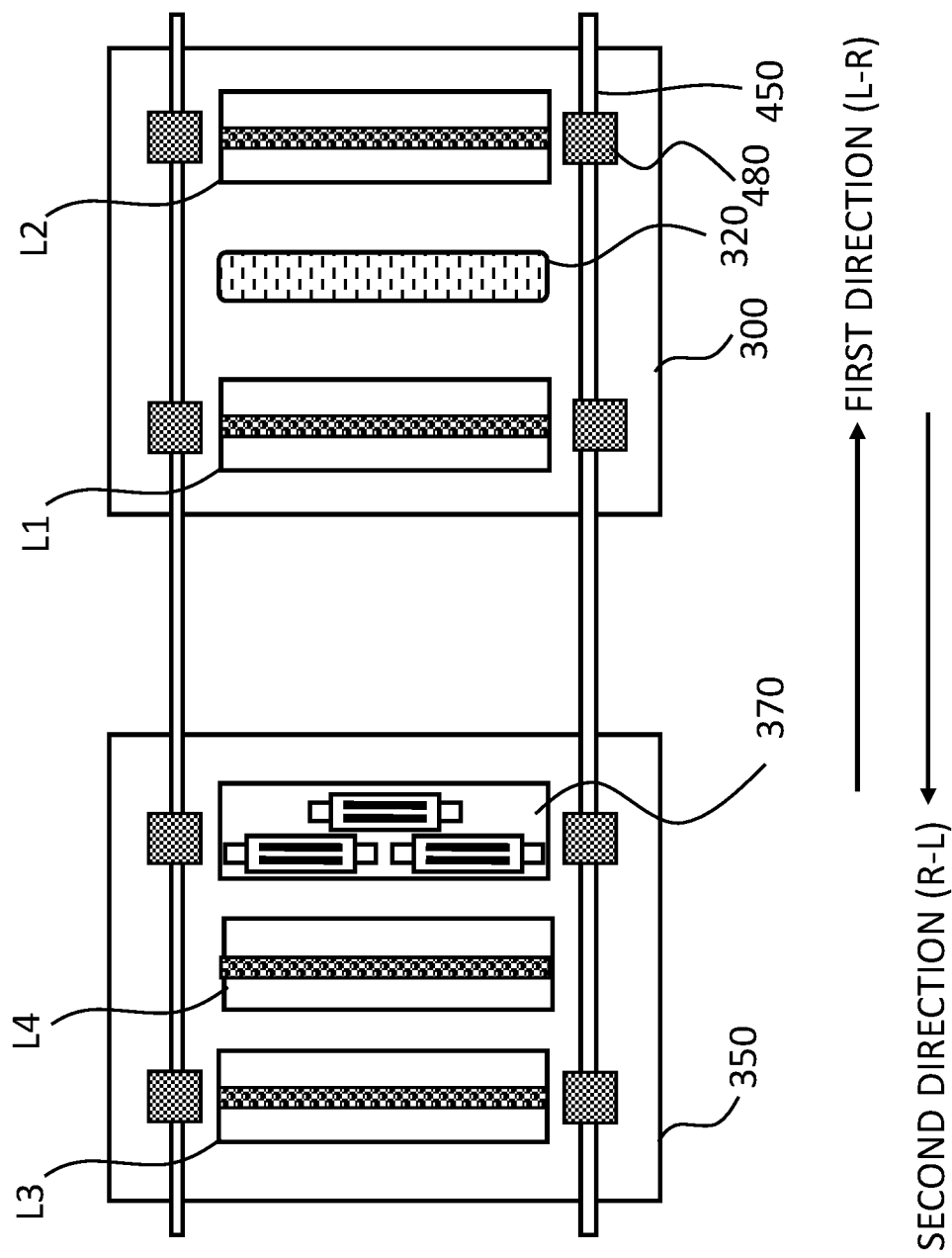
FIG. 6C schematically illustrates the arrangement of a powder distribution sled and a print sled according to a third variant of second sled layout "B" (viewed from below)

In another example (shown in FIGS. 3A and 6C), the powder distribution sled 300 may comprise a powder distribution device 320 and radiation source assemblies L1, L2 on both sides of the powder distribution device 320. On the other hand, the print sled 350 may comprise droplet deposition heads 370 and the two radiation source assemblies L3, L4 both located on one side of the droplet deposition heads 370, in the second direction relative to the droplet deposition heads 370. This arrangement of two radiation source assemblies side by side may be useful for powder materials which require higher intensity radiation to preheat and/or sinter, as the second radiation source assembly may be activated to supplement the first radiation source assembly. This combination may provide five preheat steps and three sinter steps. The method may allow extra fluid to be deposited without any sintering in between, and therefore may improve the consistency of position of deposition of fluid within the object, especially for large objects where a lot of shrinkage may be incurred during sintering. The above combination may also yield seven sinter steps and one preheat step which may impart the maximum heat into deposited areas and may be useful for powder materials with high latent heat of fusion.

In another example (shown in FIG. 3B), the powder distribution sled 300 may comprise a powder distribution device 320 and radiation source assemblies L1, L2 on both sides of the powder distribution device 320. On the other hand, the print sled 350 may comprise droplet deposition heads 370 and the two radiation source assemblies L3, L4 both located on one side of the droplet deposition heads 370, in the first direction relative to droplet deposition heads 370. This combination may provide seven preheat steps and one sinter step or three preheat steps and five sinter steps.

In another example (shown in FIG. 6B), the powder distribution sled 300 may comprise the two radiation source assemblies L1, L2 both located on one side of the powder distribution device 320, in the first direction relative to the powder distribution device 320. On the other hand, the print sled 350 may comprise droplet deposition heads 370 and the two radiation source assemblies L3, L4 on both sides of droplet deposition heads 370. This combination may provide one preheat step and seven sinter steps or three preheat steps and five sinter steps.

Figure 6E:
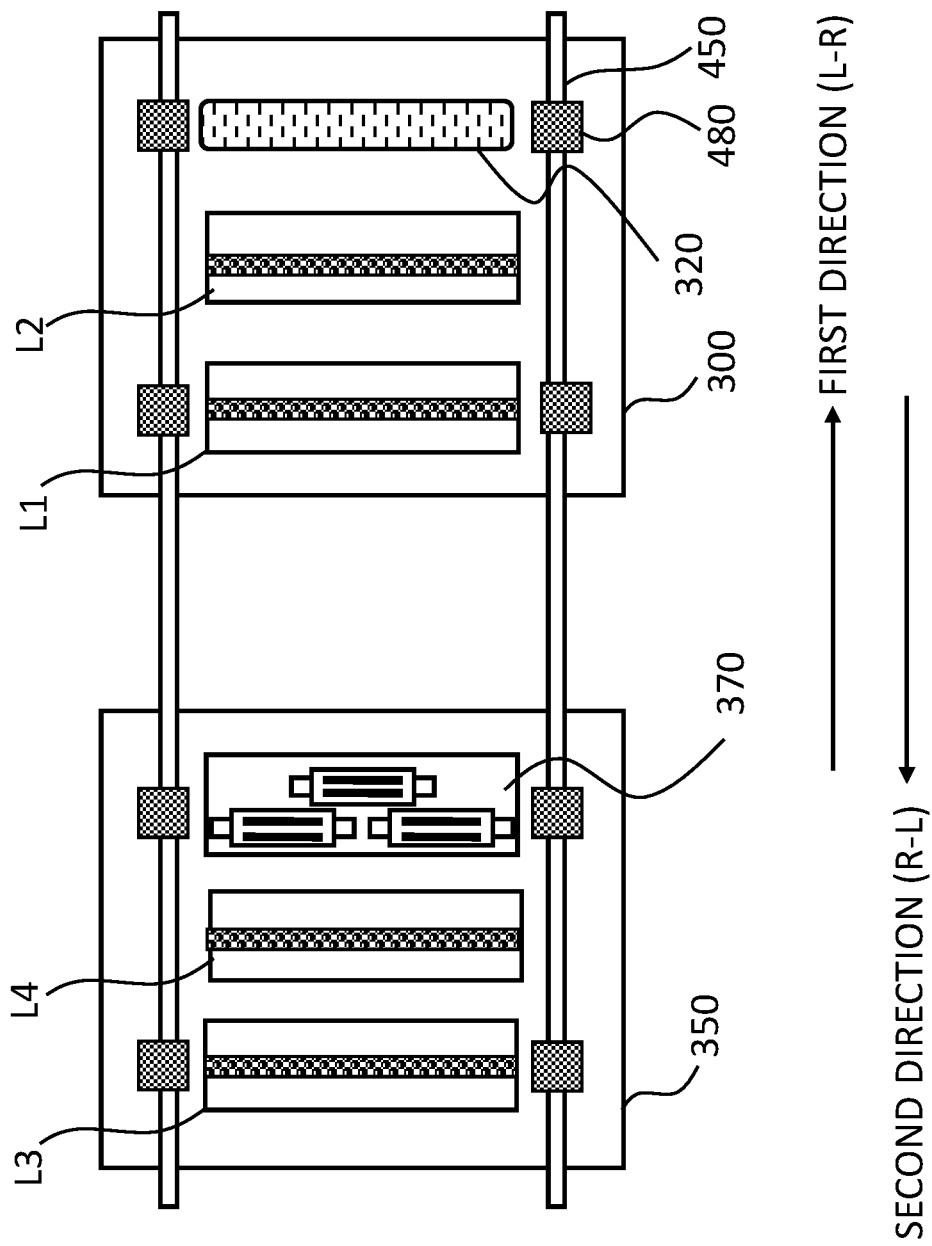
FIG. 6E schematically illustrates the arrangement of a powder distribution sled and a print sled according to a fifth variant of second sled layout "B" (viewed from below)

In further example (shown in FIGS. 3E and 6E), the powder distribution sled 300 may comprise the two radiation source assemblies L1, L2 both located on one side of the powder distribution device 320, in the second direction relative to the powder distribution device 320. The print sled 350 may comprise the two radiation source assemblies L3, L4 both located on one side of the droplet deposition heads 370, in the second direction relative to the droplet deposition heads 370. This arrangement of two radiation source assemblies side by side may be useful for the powder materials which require higher intensity radiation to preheat and/or sinter, as the second radiation source assembly may be activated to supplement the first radiation source assembly. This combination may result in six sinter steps and two preheat steps. The two preheat steps prior to sintering may be useful for powder materials that need to be distributed cold but then require to be heated quickly to avoid cooling of the powder and to avoid warping in preceding layers. Also six sinter steps may allow the parts of the layer on which fluid was deposited to melt completely, and may create strong objects without overheating the surrounding powder. Moreover, the above combination may also provide six preheat steps and two sinter steps which may be advantageous for achieving an even build bed temperature.

Heating Considerations

It should be noted that it is possible to achieve at least four preheat steps or four sinter steps with the provision of two radiation source assemblies on the powder distribution sled 300 and two radiation source assemblies on the print sled 350. Furthermore, it is possible to achieve seven preheat steps or seven sinter steps.

Figure 9:
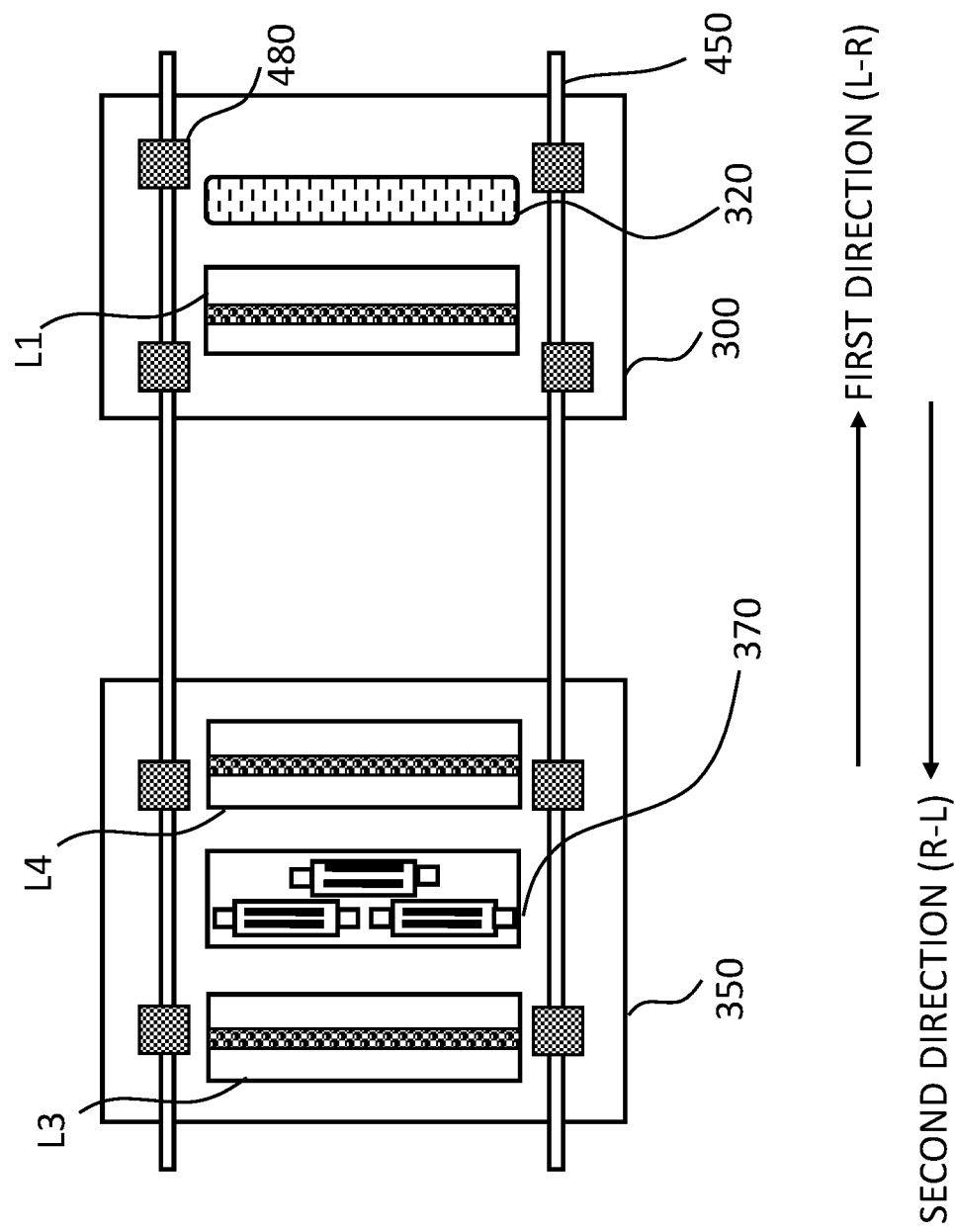
FIG. 9 schematically illustrates the arrangement of a powder distribution sled and a print sled according to a third sled layout "C" (viewed from below)

It should be appreciated that the number of radiation source assemblies on each sled are not limited to two, and more than two radiation source assemblies may be provided on each sled depending on the process requirements and/or depending on the powder material. For example, some powders with high latent heat of fusion may require more sintering or some powders may require more preheating as they may be distributed cold for easy flow and then heated up to be ready for sintering. Furthermore, one sled may comprise only one radiation source assembly, and the number of radiation source assemblies may not be equal on both the sleds. For example, one sled may have one radiation source assembly while another sled may have two radiation source assemblies (as shown in FIG. 9). Moreover, even if two radiation source assemblies are mounted on a sled, it is possible to completely switch OFF one radiation source assembly for the entire manufacturing process of the object.

It should be appreciated that, in the above examples, if two radiation source assemblies are mounted next to each other, they may operate as (and be considered as) a single radiation source assembly.

The maximum possible number of steps may be determined by the total number of radiation source assemblies on all the sleds used in the apparatus 1. The maximum possible number of steps is twice the total number of radiation source assemblies on all sleds. For example, according to a third sled layout "C" shown in FIG. 9, the total number of radiation source assemblies on the print sled and the powder distribution sled are three, hence a maximum possible number of six preheat and sinter steps can be obtained.

Multiple gentle low intensity preheat steps help to keep the build bed temperature uniform and avoid thermal hotspots. Hence, even if large build beds are used, it is possible to maintain uniform temperature throughout the build bed. Moreover, multiple gentle preheat steps are useful for powders that require careful preheating, such as materials with a small supercooling process window for which there is a slight temperature difference between melting and re-freezing, or materials with a high melt temperature and/or high re-freezing temperature.

The multiple gentle low intensity sinter steps can increase the inter-particle bond strength, and hence an object with good mechanical properties can be obtained. Multiple sinter steps are also beneficial for materials with high melting temperature, for example, PEEK, PEK, PAEK, PA6, PA4,6, PA6,6, or for materials with high melt viscosity, for example, elastomers, TPU, TPE, PP, or for materials with a high latent heat of fusion that require more energy to become liquid and sinter, for example, amorphous polymer such as ABS, PC.

The preheat and/or sinter steps described in this disclosure may use the same intensity and/or wavelength of the various radiation source assemblies. Alternatively, each preheat and/or sinter step may utilise each radiation source assembly with a different intensity and/or wavelength. The intensity and/or wavelength of a radiation source assembly may be controlled depending on temperature feedback from the build area, or based on the powder material, and it may vary in the same layer or may vary layer by layer. For example, the preheat step after the powder distribution may have a higher intensity and/or wavelength than the other preheat steps.

Apparatus Considerations

More generally, and with reference to FIG. 9, according to the present disclosure the print sled 350 comprises one or more droplet deposition heads 370 for depositing a fluid, a first radiation source assembly L3 and a second radiation source assembly L4. The powder distribution sled 300 comprises a powder distribution device 320 for distributing the powder and a third radiation source assembly L1. The third sled layout "C" as shown in FIG. 9 depicts the first radiation source assembly L3 located on one side of the droplet deposition heads 370, in the second direction relative to the droplet deposition heads 370, the second radiation source assembly L4 located on the other side of the droplet deposition heads 370, in the first direction relative to the droplet deposition heads 370 and the third radiation source assembly L1 located on one side of the powder distribution device 320, in the second direction relative to the powder distribution device 320. With this arrangement, it may be possible achieve five sinter steps and one preheat step or three preheat steps and three sinter steps. Furthermore, by rearrangement, the different combinations of two radiation source assemblies on the print sled 350 and one radiation source assembly on the powder distribution sled 300 are possible, and can result in five preheat steps and one sinter step or three preheat steps and three sinter steps, or four preheat/sinter steps and two sinter/preheat steps. One may select an appropriate combination depending on the process requirements.

According to another variant, the print sled 350 comprises one or more droplet deposition heads 370 and a first radiation source assembly L3 located on one side of the droplet deposition heads 370, in the second direction relative to the droplet deposition heads 370. The powder distribution sled 300 comprises a powder distribution device 320, a third radiation source assembly L1 and a fourth radiation source assembly L2, both located on one side of the powder distribution device 320, in the second direction relative to the powder distribution device 320. This arrangement results in two preheat steps and four sinter steps or five preheat steps and one sinter step. Alternatively, the two radiation source assemblies L1, L2 on the powder distribution sled 300 may both be located on one side of the powder distribution device 320, in the first direction relative to the powder distribution device 320, and the first radiation source assembly L3 on the print sled 350 may be located on one side of the droplet deposition heads 370, in the first direction relative to the droplet deposition heads 370. It is possible to realise five sinter steps and one preheat step or four sinter steps and two preheat steps. By rearrangement, different combinations of radiation source assemblies and different combinations of preheat and sinter steps can be envisioned.

However, the examples mentioned above are non-limiting, and methods resulting in multiple preheat steps and/or multiple sinter steps from any combination of the above-mentioned elements on the powder distribution sled 300 and elements on the print sled 350 may be envisaged. Furthermore, methods with a further number of elements such as one or more further radiation source assemblies, one or more further powder distribution devices or one or more further droplet deposition heads, on either or both the sleds, based on the required number of preheat steps and/or sinter steps, are also possible. Moreover, the droplet deposition heads and the powder distribution device may be provided on the same sled with two or more radiation source assemblies.

It should be noted that the powder distribution sled and the print sled may be mounted on separate rails one above another. This may be advantageous to achieve a greater number of preheat and/or sinter steps. In the above-described methods, the two sleds may be parked one above another or may be slightly offset from one another. Also, it is possible to independently move the two sleds close to each other with an appropriate slight offset and hence the timing of sintering, preheating and deposition may be controlled appropriately and accurately.

With any of the above-described sled layout options and methods, a droplet deposition head cleaning station may be provided. The droplet deposition head cleaning station may be located at the opposite end of the work surface from the powder supply module 410. Once the print sled 350 has reached the end of one print step, the droplet deposition heads 370 may be cleaned before the next print step. The droplet deposition heads 370 may be cleaned after every print step, after every set number of print steps, or in response to a droplet deposition head nozzle monitoring system.

Optional Sled

Figure 10:
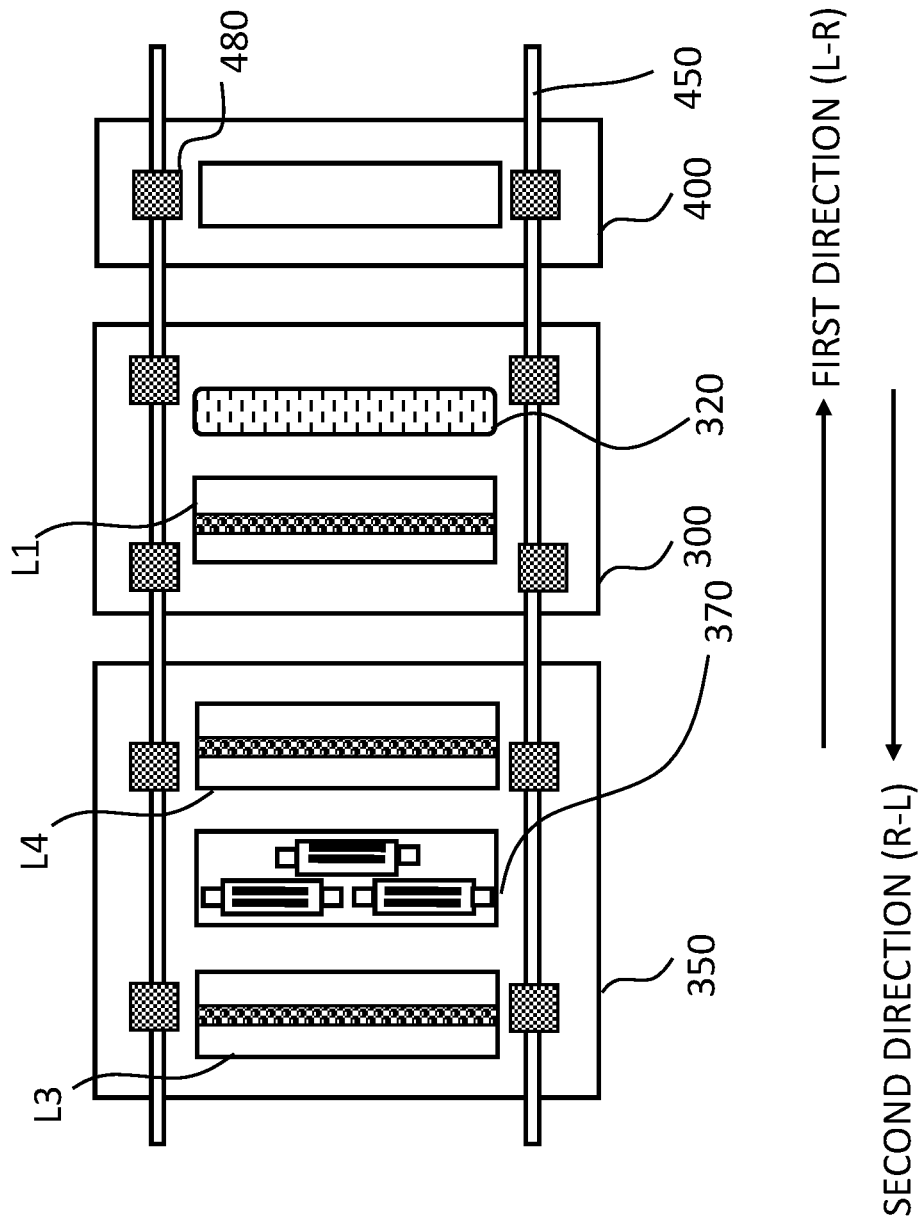
FIG. 10 schematically illustrates the arrangement of a powder distribution sled, a print sled and a third sled (viewed from below).

More generally, and with reference to FIG. 10, according to the present disclosure the apparatus 1 may further comprise a third sled 400 being driveable in the first direction (L-R) along a third axis across the build area, and driveable in the second direction (R-L), opposite to the first direction, along the third axis. That is to say, the third sled 400 is bi-directionally driveable along the third axis across the build area. The third axis may be parallel to, or coaxial with, the above mentioned first and second axes. The third sled may comprise a further radiation source assembly. Additionally and/or alternatively, the third sled may comprise a powder distribution device for distributing or levelling the layer of powder, and/or one or more droplet deposition heads to deposit a (second) fluid.

The powder distribution device mounted on the third sled may be used to level the layer of powder which was previously distributed by the powder distribution device 320 that is mounted on the powder distribution sled 300. The powder distribution device of the third sled may smoothen and/or compact the layer of powder. Such levelling of the layer of powder before passing of the droplet deposition heads over the build area may be advantageous to avoid adhering of the powder to the nozzle surface and hence protect the droplet deposition heads from an uneven layer of powder. Alternatively, the third sled may be arranged in the second direction relative to the powder distribution sled 300. The powder distribution device of the third sled may be utilised to deposit a further layer of powder over the layer deposited by the powder distribution device 320 of the powder distribution sled 300, to generate a thick layer of powder. The fluid deposition and sintering may follow on that thick layer of powder.

The droplet deposition heads located on the third sled may deposit a non-sinter-promoting fluid or a different fluid than that deposited by the droplet deposition heads 370 mounted on the print sled 350. The fluid may be a liquid such as a radiation absorbing material (RAM) or a fluid powder comprising a radiation absorbing material. Moreover, the fluid may be a sinter-promoting fluid or a fluid that may inhibit the sintering and may thereby enhance the edge definition of the object.

The third sled may comprise one or more radiation source assemblies depending on the required preheat and/or sinter steps. The radiation source assembly may be located on one side of the droplet deposition heads and/or the levelling device, in the first direction and/or in the second direction relative to the droplet deposition heads and/or the levelling device.

It may be advantageous to have a third sled in the case of powder materials which require careful preheating and sintering. With multiple preheating steps, it is possible to control the exposure of radiation to the powder.

According to another variant, the third axis may be perpendicular to the first and second axes which may make the apparatus 1 more compact. Moreover, with the perpendicular sled arrangement and with the radiation source assembly on the third sled, the radiation source assembly may uniformly preheat and/or sinter the layer of powder by scanning the build area in the other direction. Furthermore, the third sled may have fewer components than the powder distribution sled 300 and the print sled 350, and consequently the third sled may move quickly across the build area, saving time between passes and achieving the desired purpose.

Controller

A controller 550 to control the sequence of powder distribution, preheating, fluid deposition, sintering will now be described. The controller 550 may be a computing device, a microprocessor, an application-specific integrated circuit (ASIC), or any other suitable device to control the functions of the various components of the printer.

The controller 550 is in communication with a data store 510 supplying print data relating to slices defining the three dimensional object to be manufactured, and, for example, information on the number and thickness of the powder layers to be distributed for each buffer layer and build layer step.

The controller 550 may execute instructions received from the data store 510 to operate the print sled 350 and the powder distribution sled 300 in a specified direction from one region to another region in a predefined time interval. Furthermore, the controller may execute instructions to control a time interval between the movement of the print sled 350 and the powder distribution sled 300. The controller may execute instructions to rotate the dosing blade to dose a pile of powder on the work surface.

The controller 550 may execute instructions to selectively switch ON and OFF the radiation source assemblies mounted on the powder distribution sled 300 and on the print sled 350. In addition, the controller 550 may receive instructions to control each radiation source assembly for preheating and/or for sintering. Instructions may include set points for e.g. radiation wavelength and/or intensity of a given radiation source assembly that the controller may use to cause the radiation source assembly to switch ON at a certain wavelength and/or intensity for a certain time period.

The controller 550 may receive instructions from the data store 510 to repeat a sequence, for example to distribute a number of buffer layers before a build.

The controller 550 may further receive instructions to cause the droplet deposition heads 370 to deposit a pattern of fluid based on image data received from the data store with respect to the specific powder layer. The image data may define a cross section of the three-dimensional object to be manufactured, such as a product part definition contained in slices of a CAD model.

In parallel, the controller 550 may receive instructions to move the powder distribution sled 300 or the print sled 350, either upon expiry of a predefined time interval or upon receiving an additional trigger signal from a temperature sensor, for example. The temperature of the build bed 201 being monitored by the sensor may be continuously provided to the controller 550, and/or upon a predetermined trigger temperature being reached based on the specific powder material being used. For example, the controller 550 may initiate the powder distribution sled 300 to move across the newly sintered layer or the controller 550 may control activation of the radiation source assemblies to achieve the required preheating or sintering temperature.

The feedback control from the temperature sensor to the controller 550 allows per-layer control of the optimal layer temperature, for example optimal preheating temperature or optimal sintering temperature.

The controller 550 may control further advantageous steps. For example the controller 550 may receive instructions to cause the build chamber floor to be lowered or elevated after specified operations, for example before distributing a new layer or before fluid deposition.

The controller 550 may execute instructions received from the data store 510 to determine whether a next powder layer is to be formed as part of the formation of the three-dimensional object. In response to a determination that a next layer is to be formed, the controller 550 may receive instructions to continue with further powder distribution, preheating, fluid deposition and sintering sequences as described.

It will be clear to one skilled in the art that many improvements and modifications can be made to the foregoing exemplary embodiments without departing from the scope of the present disclosure.

The invention claimed is:

1. A method of manufacturing a three-dimensional object from a powder using an apparatus to form each layer of the object, wherein the apparatus comprises:

a build bed having a build area, wherein successive layers of said three-dimensional object are formed in the build bed;

a powder distribution sled operable to distribute a layer of powder within the build area, the powder distribution sled being driveable in a first direction along a first axis, across the build area, and driveable in a second direction, opposite to the first direction, along the first axis; and a print sled operable to deposit a pattern of radiation absorbing fluid onto the layer of powder within the build area to define the cross section of said object in said layer, the print sled being driveable in the first direction along a second axis across the build area, and driveable in the second direction along the second axis;

wherein the first axis is parallel to, or coaxial with, the second axis;

wherein the powder distribution sled and the print sled are independently movable;

wherein the print sled comprises one or more droplet deposition heads for depositing the radiation absorbing fluid, a first radiation source assembly, and a second radiation source assembly;

wherein the first radiation source assembly is located on one side of the one or more droplet deposition heads, in the second direction relative to the one or more droplet deposition heads, and the second radiation source assembly is located on the other side of the one or more droplet deposition heads, in the first direction relative to the one or more droplet deposition heads; and wherein the powder distribution sled comprises a powder distribution device for distributing the powder, a third radiation source assembly and a fourth radiation source assembly, wherein the third radiation source assembly is located on one side of the powder distribution device, in the second direction relative to the powder distribution device, and the fourth radiation source assembly is located on the other side of the powder distribution device, in the first direction relative to the powder distribution device;

wherein, to form each layer of said object, the method comprises the steps of:

(a) driving the powder distribution sled in the first direction across at least part of the build area and
  (a1) distributing a layer of powder within the build area;

(b) driving the print sled in the first direction across at least part of the build area;

(c) driving the print sled in the second direction;

(d) driving the powder distribution sled in the second direction;

(e) driving the powder distribution sled in the first direction; and repeating from step (a1) to distribute the next layer of powder within the build area;

wherein the method further comprises preheating the layer of powder by activating the third radiation source assembly during step (e), and optionally by any or all of:

(f1) activating the second radiation source assembly during step (b);

(f2) activating the first radiation source assembly during step (b);

(f3) activating the first radiation source assembly during step (c);

wherein the method further comprises, during step (b) and/or step (c), depositing a pattern of fluid onto the layer of powder within the build area using the one or more droplet deposition heads; and wherein the method further comprises sintering the powder on which fluid was deposited only in the second direction, by any or all of:

(g1) activating the first radiation source assembly during step (c) to sinter the powder underlying the fluid deposited during step (b);

(g2) activating the second radiation source assembly during step (c) to sinter the powder underlying the fluid deposited during step (b) and/or step (c);

(g3) activating the third radiation source assembly during step (d) to sinter the powder underlying the fluid deposited during step (b) and/or step (c);

(g4) activating the fourth radiation source assembly during step (d) to sinter the powder underlying the fluid deposited during step (b) and/or step (c).

2. The method according to claim 1 wherein, to form each layer of said object, the method comprises at step (c) the step of depositing a pattern of fluid onto the layer of powder; by the first radiation source assembly, at least one of the preheating steps (f2) or (f3); by the second radiation source assembly at least one of the preheating step (f1) and the sintering step (g2); and by the fourth radiation source assembly the sintering step (g4), and wherein the method does not comprise depositing a pattern of fluid onto the layer of powder at step (b).

3. The method according to claim 2, further comprising the two sintering steps (g2) and (g4).

4. The method according to claim 2, further comprising the sintering step (g3) by the third radiation source assembly.

5. The method according to claim 4, further comprising a third sintering step (g3) by the third radiation source assembly.

6. The method according to claim 1 wherein, to form each layer of said object, the method comprises at step (c) the step of depositing a pattern of fluid onto the layer of powder; by the first radiation source assembly, at least one of the preheating steps (f2) or (f3); by the second radiation source assembly the sintering step (g2); and by the fourth radiation source assembly the sintering step (g4), and wherein the method does not comprise depositing a pattern of fluid onto the layer of powder at step (b).

7. The method according to claim 1, further comprising at least two sintering steps.

8. The method according to claim 6, further comprising the sintering step (g3) by the third radiation source assembly.

9. The method according to claim 1 wherein, to form each layer of said object, the method includes, during step (b), depositing a pattern of fluid onto the layer of powder; by the first radiation source assembly, the sintering step (g1); by the second radiation source assembly at least one of the preheating step (f1) and the sintering step (g2); and by the fourth radiation source assembly the sintering step (g4), and wherein the method does not comprise the preheating step (f2) by the first radiation source assembly.

10. The method according to 1 wherein, to form each layer of said object, the method includes four sintering steps (g1), (g2), (g3) and (g4).

11. The method according to claim 9, further comprising during step (c), depositing a pattern of fluid onto the layer of powder, and sintering the fluid deposited at step (c) by at least one of the sintering steps (g2), (g3) and (g4).

* * * * *